United States Patent
Park et al.

(10) Patent No.: US 9,014,310 B2
(45) Date of Patent: Apr. 21, 2015

(54) ULTRA-LOW POWER SUPER-REGENERATIVE RECEIVER AND METHOD THEREOF

(75) Inventors: Chang Soon Park, Chungju-si (KR); Young Jun Hong, Seoul (KR); Joon Seong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 13/587,985

(22) Filed: Aug. 17, 2012

(65) Prior Publication Data

US 2013/0107988 A1    May 2, 2013

(30) Foreign Application Priority Data

Nov. 1, 2011  (KR) .................. 10-2011-0112833

(51) Int. Cl.
 H04L 27/06  (2006.01)
 H04B 1/24   (2006.01)
 H03D 1/00   (2006.01)

(52) U.S. Cl.
 CPC ........................................ H04B 1/24 (2013.01)

(58) Field of Classification Search
 CPC .............. H04L 27/2332; H04L 1/0045; H04L 2027/003; H04L 27/2647; H04L 7/042; H04L 27/2662
 USPC .................................. 375/316, 324, 340, 343
 See application file for complete search history.

(56) References Cited

U.S. PATENT DOCUMENTS

| | | | |
|---|---|---|---|
| 5,960,040 A * | 9/1999 | Cai et al. | 375/279 |
| 6,363,102 B1 * | 3/2002 | Ling et al. | 375/147 |
| 6,993,315 B1 * | 1/2006 | Frazier | 455/334 |
| 7,908,481 B1 | 3/2011 | Donzis et al. | |
| 7,917,649 B2 | 3/2011 | Soukup | |
| 8,761,307 B1 * | 6/2014 | Ionescu et al. | 375/316 |
| 2009/0016548 A1 | 1/2009 | Monat et al. | |

FOREIGN PATENT DOCUMENTS

| | | |
|---|---|---|
| JP | 2005-129974 A | 5/2005 |
| KR | 10-2003-0080412 A | 10/2003 |
| KR | 10-0665330 B1 | 1/2007 |
| KR | 10-2009-0063083 A | 6/2009 |

OTHER PUBLICATIONS

Choi et al., An Experimental Coin-Sized Radio for Extremely Low-Power WPAN (IEEE 802.15.4) Application at 2.4 GHz, IEEE Journal of Solid-State Circuits, Dec. 2003, pp. 2258-2268, vol. 38, No. 12.

Moncunill-Geniz et al., A Generic Approach to the Theory of Super-regenerative Reception, IEEE Transactions on Circuits and Systems-I: Regular Papers, Jan. 2005, pp. 54-70, vol. 52, No. 1.

* cited by examiner

Primary Examiner — Ted Wang
(74) Attorney, Agent, or Firm — NSIP Law

(57) ABSTRACT

An ultra-low power super-regenerative receiver and method thereof are provided. The ultra-low power super-regenerative receiver includes a quench waveform generator configured to generate a quench waveform. The ultra-low power super-regenerative receiver further includes a super-regenerative oscillator configured to generate an oscillation signal based on the quench waveform. The ultra-low power super-regenerative receiver further includes a bandwidth adjustor configured to control the quench waveform based on a bandwidth of a signal received by the ultra-low power super-regenerative receiver, to dynamically adjust a bandwidth of the oscillation signal.

25 Claims, 22 Drawing Sheets

ULTRA-LOW POWER SUPER-REGENERATIVE RECEIVER AND METHOD THEREOF

CROSS-REFERENCE TO RELATED APPLICATION(S)

This application claims the benefit under 35 U.S.C. §119(a) of Korean Patent Application No. 10-2011-0112833, filed on Nov. 1, 2011, in the Korean Intellectual Property Office, the entire disclosure of which is incorporated herein by reference for all purposes.

BACKGROUND

1. Field

The following description relates to an ultra-low power super-regenerative receiver and method thereof.

2. Description of Related Art

With the rapid development and commercialization of wireless network technology, wireless sensor networks have been rapidly-extended. Standardization of wireless network technology based on, for example, Bluetooth, IEEE 802.15.4, ZigBee, and/or other types of standards, have led to wireless sensor networks being standardized.

A usage area of a wireless sensor network may include various environments, such as, for example, home security, medical fields, mobile health care, monitoring of a chemical and biological abnormality, diagnosis of a mechanical abnormality and malfunction, monitoring of an environment, sensing of information associated with a disaster, intelligent distribution management, real-time security, remote monitoring, and/or other types of environments. A size of a sensor, in various wireless sensor networks and local area networks, may be relatively small. To operate a relatively large number of sensors over a relatively long period of time, conditions of a low power and a low complexity for each sensor, may be needed.

For example, sensors of a wireless body area network (WBAN) in which the sensors are installed in a human body, may need to meet more rigorous standards of low power and low complexity to perform wireless communication with a neighboring mobile device and with each other. To meet such rigorous standards of low power and low complexity, each sensor may include an ultra-low power radio frequency (RF) structure rather than a high power RF structure.

However, use of an ultra-low power analog circuit may degrade overall performance in a system. Accordingly, there is a need to improve performance of the system including a sensor using the ultra-low power analog circuit.

SUMMARY

In one general aspect, there is provided an ultra-low power super-regenerative receiver comprising a quench waveform generator configured to generate a quench waveform. The ultra-low power super-regenerative receiver further includes a super-regenerative oscillator configured to generate an oscillation signal based on the quench waveform. The ultra-low power super-regenerative receiver further includes a bandwidth adjustor configured to control the quench waveform based on a bandwidth of a signal received by the ultra-low power super-regenerative receiver, to dynamically adjust a bandwidth of the oscillation signal.

The bandwidth adjustor is further configured to control a period of the quench waveform based on the bandwidth of the received signal. The bandwidth adjustor is further configured to control an absolute value of a slope at a zero-crossing point of the quench waveform based on the bandwidth of the received signal.

The quench waveform generator is further configured to delay the quench waveform by a predetermined time interval to generate as many quench waveforms as a number of over-samplings. The bandwidth adjustor is further configured to control the quench waveforms based on the bandwidth of the received signal.

The ultra-low power super-regenerative receiver further includes super-regenerative oscillators configured to concurrently generate oscillation signals based on the respective quench waveforms in a symbol duration time of the oscillation signals.

The ultra-low power super-regenerative receiver further includes envelope detectors configured to detect envelopes of the respective oscillation signals. The ultra-low power super-regenerative receiver further includes a sampling unit configured to sample and perform analog-to-digital conversion (ADC) of peak values of the envelopes.

The ultra-low power super-regenerative receiver further includes a bit synchronizer configured to determine a first correlation value between the peak values and an original code sequence, determine a second correlation value between the peak values and a circularly-shifted code sequence, and determine a pulse-level position and a code-level position of one of the envelopes based on a maximum correlation value between the correlation values.

The ultra-low power super-regenerative receiver further includes a frame synchronizer configured to detect a predetermined bit sequence based on the pulse-level position. The ultra-low power super-regenerative receiver further includes a data detector configured to detect data based on the pulse-level position after the detecting of the predetermined bit sequence.

The ultra-low power super-regenerative receiver further includes a quench waveform application unit configured to apply, to the super-regenerative oscillator, the quench waveform during a first time period in a symbol duration time of the oscillation signal and based on an over-sampling rate, and apply, to the super-regenerative oscillator, the quench waveform after a second time period of time delay in the symbol duration time.

The ultra-low power super-regenerative receiver further includes an envelope detector configured to detect an envelope of the oscillation signal. The ultra-low power super-regenerative receiver further includes a sampling unit configured to sample and perform ADC of peak values of the envelope.

The ultra-low power super-regenerative receiver further includes a bit synchronizer configured to determine a correlation value between the peak values and an original code sequence, determine a correlation value between the peak values and a circularly-shifted code sequence, and determine a pulse-level position and a code-level position of the envelope based on a maximum correlation value among the correlation values.

The ultra-low power super-regenerative receiver further includes a frame synchronizer configured to detect a predetermined bit sequence based on the pulse-level position. The ultra-low power super-regenerative receiver further includes a data detector configured to detect data based on the pulse-level position after the detecting of the predetermined bit sequence.

The ultra-low power super-regenerative receiver further includes a first quench waveform generator configured to delay the quench waveform by a predetermined time interval based on an initial sampling time to generate a first quench waveform. The ultra-low power super-regenerative receiver further includes a second quench waveform generator configured to advance the quench waveform by the predetermined time interval based on the initial sampling time to generate a second quench waveform.

The ultra-low power super-regenerative receiver further includes a first super-regenerative oscillator configured to generate a first oscillation signal based on the first quench waveform in a symbol duration time of the oscillation signal. The ultra-low power super-regenerative receiver further includes a second super-regenerative oscillator configured to generate a second oscillation signal based on the second quench waveform in the symbol duration time.

The ultra-low power super-regenerative receiver further includes a first envelope detector configured to detect a first envelope of the first oscillation signal. The ultra-low power super-regenerative receiver further includes a second envelope detector configured to detect a second envelope of the second oscillation signal. The ultra-low power super-regenerative receiver further includes a sampling unit configured to sample and perform ADC of respective peak values of the first envelope and the second envelope.

The ultra-low power super-regenerative receiver further includes a calculator configured to calculate a correlation value between the peak values and an original code sequence, calculate a correlation value between the peak values and a circularly-shifted code sequence, and calculate a correlation value comprising a greatest value in each pulse-level position. The ultra-low power super-regenerative receiver further includes a sampling time update unit configured to update the initial sampling time based on a difference between a first correlation value corresponding to a greatest value among values calculated at a pulse-level position that is temporally advanced and a second correlation value corresponding to a greatest value among values calculated at a pulse-level position that is temporally delayed. The ultra-low power super-regenerative receiver further includes a determining unit configured to determine, to be an optimal sampling time, a sampling time in which an absolute value of the difference between the first correlation value and the second correlation value is less than a predetermined value. The ultra-low power super-regenerative receiver further includes a bit synchronizer configured to determine a pulse-level position corresponding to the optimal sampling time, and determine, as a code-level position, a circularly-shifted code sequence comprising a greatest value.

The ultra-low power super-regenerative receiver further includes a frame synchronizer configured to detect a predetermined bit sequence based on a peak value sampled through a quench waveform to which the optimal sampling time is applied. The ultra-low power super-regenerative receiver further includes a data detector configured to detect data based on the peak value after the detecting of the predetermined bit sequence.

The ultra-low power super-regenerative receiver further includes a quench waveform application unit configured to advance the quench waveform by a predetermined time interval based on an initial sampling time, apply, to the super-regenerative oscillator, the advanced quench waveform during a first time period in a symbol duration time of the oscillation signal, delay the quench waveform by the predetermined time interval based on the initial sampling time, and apply, to the super-regenerative oscillator, the delayed quench waveform after a second time period of time delay in the symbol duration time.

The ultra-low power super-regenerative receiver further includes an envelope detector configured to detect an envelope of the oscillation signal. The ultra-low power super-regenerative receiver further includes a sampling unit configured to sample and perform analog-to-digital conversion (ADC) peak values of the envelope.

The ultra-low power super-regenerative receiver further includes a calculator configured to calculate a correlation value between the peak values and an original code sequence, calculate a correlation value between the peak values and a circularly-shifted code sequence, and calculate a correlation value comprising a greatest value in each pulse-level position. The ultra-low power super-regenerative receiver further includes a sampling time update unit configured to update the initial sampling time based on a difference between a first correlation value corresponding to a greatest value among values calculated at a pulse-level position that is temporally advanced and a second correlation value corresponding to a greatest value among values calculated at a pulse-level position that is temporally delayed; The ultra-low power super-regenerative receiver further includes a determining unit configured to determine, to be an optimal sampling time, a sampling time in which an absolute value of the difference between the first correlation value and the second correlation value is less than a predetermined value. The ultra-low power super-regenerative receiver further includes a bit synchronizer to determine a pulse-level position corresponding to the optimal sampling time, and determine, as a code-level position, a circularly-shifted code sequence comprising a greatest value.

In another general aspect, there is provided an ultra-low power super-regenerative receiver comprising a first bandwidth adjustor configured to generate a quench waveform comprising a shorter period than a period of a signal received by the ultra-low power super-regenerative receiver, acquire analog-to-digital conversion (ADC) samples in a symbol duration time of an output signal based on the quench waveform, and perform bit synchronization based on the ADC samples to generate a pulse-level position of the received signal. The ultra-low power super-regenerative receiver further includes a second bandwidth adjustor configured to set a time for the quench waveform based on the pulse-level position, control a period of the quench waveform based on a bandwidth of the received signal, and control an absolute value of a slope at a zero-crossing point of the quench waveform, to dynamically adjust a bandwidth of the output signal.

The second bandwidth adjustor comprises a quench waveform controller configured to increase the period of the quench waveform based on the bandwidth of the received signal, and decrease the slope at the zero-crossing point of the quench waveform, to control a shape of the quench waveform.

The ultra-low power super-regenerative receiver further includes a signal power estimator configured to estimate signal powers for the ADC samples. The ultra-low power super-regenerative receiver further includes a frame synchronizer configured to detect a predetermined bit sequence based on the ADC samples. The ultra-low power super-regenerative receiver further includes a data detector configured to detect data based on one of the ADC samples after the detecting of the predetermined bit sequence.

In still another general aspect, there is provided an ultra-low power super-regenerative receiving method comprising generating a quench waveform. The method further includes generating an oscillation signal based on the quench waveform. The method further includes controlling the quench waveform based on a bandwidth of an input signal, to dynamically adjust a bandwidth of the oscillation signal.

The ultra-low power super-regenerative receiving method further includes controlling a period of the quench waveform based on the bandwidth of the input signal. The method further includes controlling an absolute value of a slope at a zero-crossing point of the quench waveform based on the bandwidth of the input signal. The method further includes generating an oscillation signal based on the quench waveform in a symbol duration time of the oscillation signal. The method further includes detecting an envelope of the oscillation signal. The method further includes sampling and performing analog-to-digital conversion (ADC) of peak values of the envelope.

The ultra-low power super-regenerative receiving method further includes determining a correlation value between the peak values and an original code sequence. The method further includes determining a correlation value between the peak values and a circularly-shifted code sequence. The method further includes determining a pulse-level position and a code-level position based on a maximum correlation value between the correlation values.

Other features and aspects may be apparent from the following detailed description, the drawings, and the claims.

Figure 1:
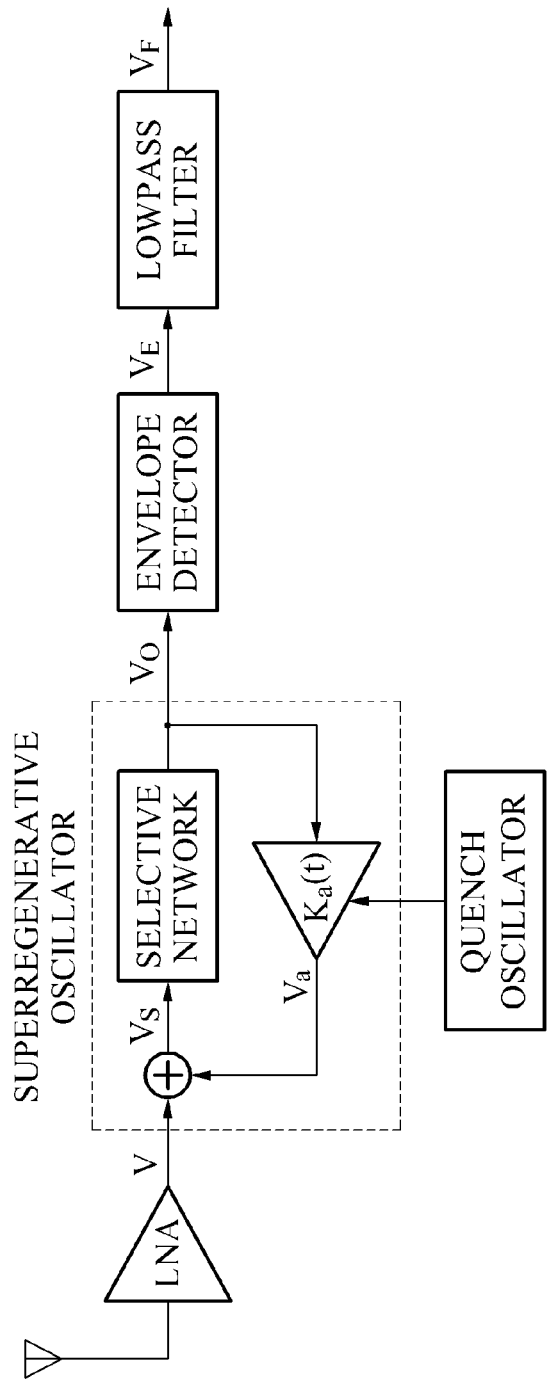
FIG. 1 is a block diagram illustrating an example of a super-regenerative receiver.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Various sensor devices installed in a wireless sensor network and a local area network may be designed to be relatively small, and to operate using low power and low complexity. A conventional receiver in a super heterodyne radio frequency (RF) structure may enhance performance, such as sensitivity, of a sensor device, using an intermediate frequency band rather than directly transforming a received signal from a high-frequency band to a baseband. However, the conventional receiver may increase complexity, cost, and power consumption of the sensor device.

For example, a modem chip in the super heterodyne RF structure may use relatively high power in an RF portion when compared with a digital baseband portion. In this example, in a modem chip for a low power wireless personal area network (WPAN), consumption power in a digital signal processing portion may be 0.5 milliwatts (mW) in both a transmission mode and a reception mode, and consumption power in an RF or analog signal processing portion may be 21 mW in a reception mode and 30 mW in a transmission mode.

Thus, reducing power of a communication modem by using various low power RF structures is needed. For example, a receiver structure using a super-regenerative receiver may correspond to a structure detecting a signal by amplifying an output signal using a positive feedback structure. In another example, the receiver structure using the super-regenerative receiver may correspond to a relatively simple RF structure using a relatively small number of active elements.

A short distance transmission and reception system using a low power and low complexity RF structure may significantly reduce power consumption. However, performance of the system may deteriorate due to performance degradation in an analog signal processing portion of the RF structure. For example, a super-regenerative receiver may involve relatively significant performance degradation due to a low selectively characteristic of a frequency response.

FIG. 1 illustrates an example of a super-regenerative receiver. An RF signal V passing through a low noise amplifier (LNA) is input into a super-regenerative oscillator (SRO). The SRO amplifies the RF signal through a positive feedback loop including a selective network and a gain of $K_a(t)$ to generate an output signal $V_O$. However, continuous amplification may cause an oscillation, and thus, an operation of terminating the oscillation may be needed. A quench oscillator may control a periodic generation and extinction of the oscillation. The RF signal input into the SRO, the output signal output from the SRO, and a damping function of a closed-loop system through the positive feedback loop may be expressed by a series of graphs of FIG. 2.

An envelope detectors receives the output signal and detects an envelope of the output signal to generate an envelope signal $V_E$. A low-pass filter receives the envelope signal and passes low frequencies of the envelope signal to generate a filtered signal $V_F$.

Figure 2:
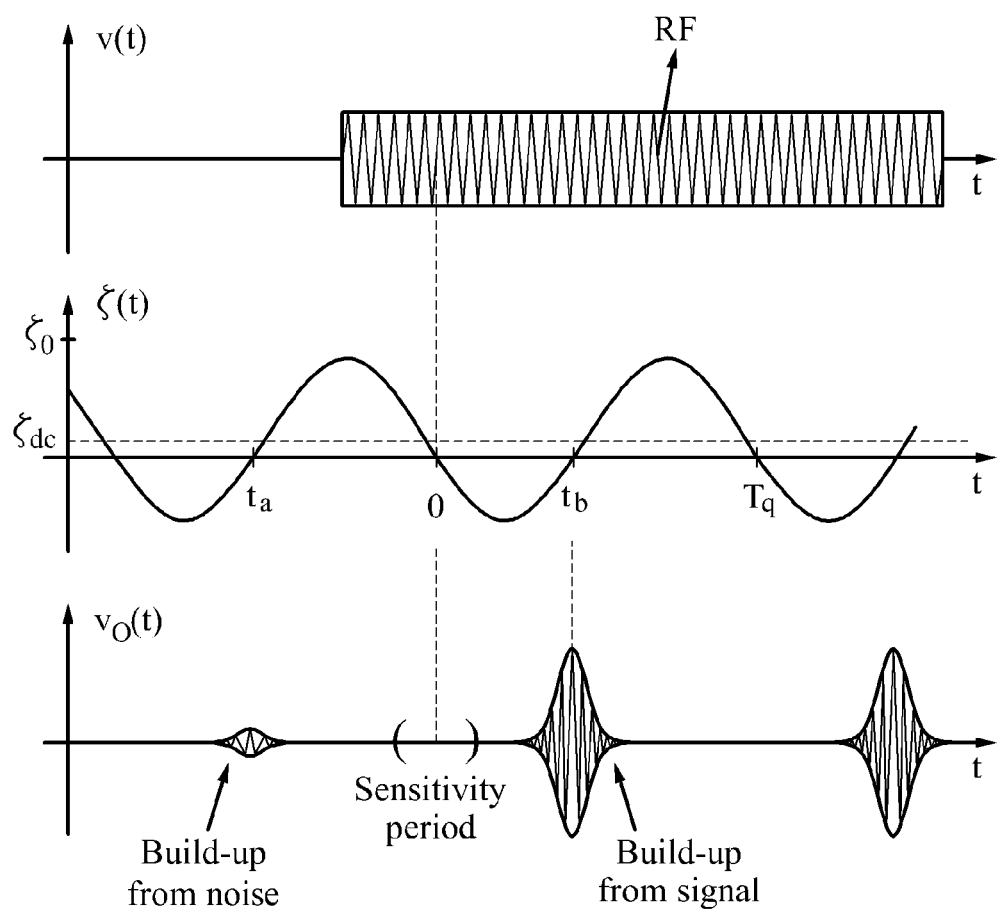
FIG. 2 is a series of graphs illustrating examples of an input signal, a damping function, and an output signal of a super-regenerative oscillator (SRO).

FIG. 2 illustrates examples of an input signal, a damping function, and an output signal of an SRO. In more detail, in response to an RF signal v(t) input into the SRO, an output signal $v_o(t)$ is generated and output from the SRO in a series form of RF pulses in which a periodic generation and extinction is repeated for each quench period $T_q$.

In this example, a damping function $\zeta(t)$ of a closed-loop system varies based on a signal of a quench oscillator. In response to a value of the damping function $\zeta(t)$ changing from a positive number to a negative number, the output signal $v_o(t)$ oscillates, and an unstable period (e.g., a build-up from noise) of the output signal $v_o(t)$ in which an amplitude value gradually increases begins. The unstable period continues until the value of the damping function $\zeta(t)$ reverts to a positive number from a negative number at time $t_a$. After the amplitude value reaches a maximum value, a stable period of the output signal $v_o(t)$ in which the amplitude value gradually decreases begins.

An RF pulse generated in the output signal $v_o(t)$ during a single quench period may occur in a subsequent quench period, and the RF pulse may overlap with an RF pulse initially-generated in the subsequent quench period, thereby causing intersymbol interference (ISI). A phenomenon in which the ISI occurs may be referred to as a hangover phenomenon. In this example, the damping function $\zeta(t)$ may include a $\zeta_{dc}$ value corresponding to a direct current (DC) value to remove the hangover phenomenon.

The amplitude value of the output signal $v_o(t)$ increases as an amplitude value of the RF signal v(t) increases at about a time 0 (e.g., a sensitivity period), as shown in a build-up from signal in FIG. 2. A main factor determining a magnitude of the amplitude value of the output signal $v_o(t)$ is a regenerative gain. The regenerative gain may be determined by integration of a sensitivity curve and a normalized envelope of the RF signal v(t). For example, in response to the RF signal v(t) being $v(t)=Vp_c(t)\cos(\omega_0 t+\phi)$, the output signal $v_o(t)$ may be determined as follows.

$$v_o = VK_O K_s K_r p(t)\cos(\omega_0 t+\phi)$$

$$K_s = \exp(-\omega_0 \int_0^{t_b} \zeta(\lambda)d\lambda)$$

$$K_r = \zeta_0 \omega_0 \int_{t_a}^{t_b} p_c(\tau)s(\tau)d\tau$$

$$s(t) = \exp(-\omega_0 \int_0^t \zeta(\lambda)d\lambda)$$

$$p(t) = \exp(-\omega_0 \int_{t_b}^t \zeta(\lambda)d\lambda)$$

In this example, V denotes a peak amplitude of the RF signal v(t), and $p_c(t)$ denotes a pulse envelope of the RF signal v(t) in which a maximum value is normalized to "1". $K_O$ denotes a maximum amplification value of the transfer function in selective network block, $K_s$ denotes a superregenerative gain, $K_r$ denotes a regenerative gain, s(t) denotes a sensitivity curve of the RF signal v(t), and p(t) denotes a normalized envelope of the RF signal v(t).

A peak amplitude of the output signal $v_o(t)$ (e.g., at a time $t_b$, as shown in FIG. 2) may not hinge on the peak amplitude of the RF signal v(t), and may be determined based on the sensitivity curve s(t) and the pulse envelope $p_c(t)$ that overlap one another to capture input energy. Signals of the pulse envelope $p_c(t)$, the sensitivity curve s(t), and a product of the regenerative gain and the normalized envelope $K_r p(t)$ based on the damping function $\zeta(t)$ are illustrated in FIG. 3.

Figure 3:
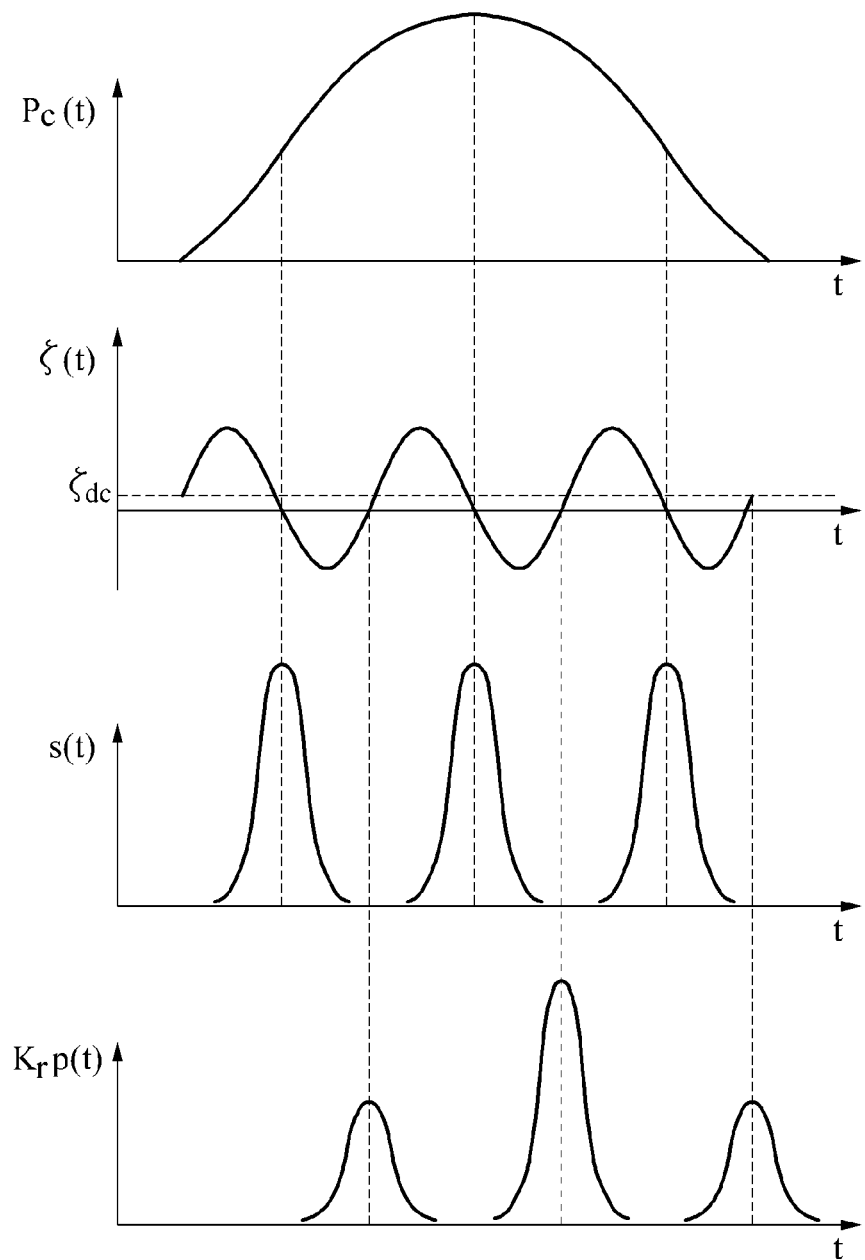
FIG. 3 is a series of graphs illustrating examples of a pulse envelope of an input signal, a damping function, a sensitivity curve of the input signal, and a product of a regenerative gain and a normalized envelope of an output signal of a SRO.

FIG. 3 illustrates examples of a pulse envelope of an input signal, a damping function, a sensitivity curve of the input signal, and a product of a regenerative gain and a normalized envelope of an output signal of an SRO. In more detail, a pulse envelope $p_c(t)$ of an RF signal (e.g., the input signal) is shown. A sensitivity curve s(t) of the RF signal exponentially increases and then exponentially decreases based on a turning point in time at which a value of a damping function $\zeta(t)$ changes from a positive number to a negative number.

A product of a regenerative gain and a normalized envelope $K_r p(t)$ of the output signal exponentially increases and then exponentially decreases based on a turning point in time at which the value of the damping function $\zeta(t)$ changes from a negative number to a positive number. When the sensitivity curve s(t) seldom overlaps with the product of the regenerative gain and the normalized envelope $K_r p(t)$, integration of the sensitivity curve s(t) and the product of the regenerative gain and the normalized envelope $K_r p(t)$ results in a near zero value, and an amplitude value of the output signal is a near zero value.

The sensitivity curve s(t) captures energy of the pulse envelope $p_c(t)$, and reflects a corresponding amplitude on a peak amplitude of the output signal. The SRO output envelope may appear at a point in time delayed from a position of the sensitivity curve s(t) on a time axis.

As illustrated in FIG. 3, a receiver to which an ultra-low power super-regenerative RF structure is applied may have difficulty in obtaining an accurate shape for a transmitted signal in a baseband, unlike a characteristic in a conventional high power and high quality super-heterodyne RF receiver. The output signal may not correspond to a signal output through a frequency conversion to restore a signal in a baseband of the RF signal. Since a signal in a different shape oscillated in response to the RF signal at a predetermined frequency in a positive feedback may be newly generated, the output signal may include a shape unrelated to an envelope of the transmitted signal. The corresponding result may constrain an application of a receiving algorithm that is used for a conventional RF receiver. Thus, the conventional receiving algorithm may be changed and applied.

The sensitivity curve s(t) may include a shape concentrated at a zero-crossing point of the damping function $\zeta(t)$ due to a characteristic of exponentially changing over time. In this example, the zero-crossing point refers to a point at which the damping function $\zeta(t)$ changes from a positive number to a negative number.

The sensitivity curve s(t) may include a narrow shape on the time axis when compared to the pulse envelope $p_c(t)$. The narrow shape of the sensitivity curve s(t) may degrade a selectivity characteristic of a super-regenerative receiver, thereby decreasing a signal-to-noise ratio (SNR) value.

According to Fourier transform theory, regarding a transformation from a time domain to a frequency domain, a wide signal on a time axis may include a narrow characteristic on the frequency domain, and a narrow signal on a time axis may include a wide characteristic on the frequency domain. Thus, receiving the sensitivity curve s(t), of a narrow characteristic, the RF signal that is wide in the time domain in the SRO may correspond to receiving, as a wide frequency bandwidth of the SRO, a narrow frequency bandwidth of the RF signal when viewed from the frequency domain.

Receiving a signal in a relatively wide frequency domain when compared to a desired signal may entail receiving a power of an additive white Gaussian noise (AWGN) that is greater than a power of the desired signal, which may lead to deterioration of the SNR value. An AWGN signal may include a uniform power density over an entire frequency domain, and thus, noise power may be additionally added to a bandwidth other than a frequency bandwidth of the desired signal.

Figure 4:
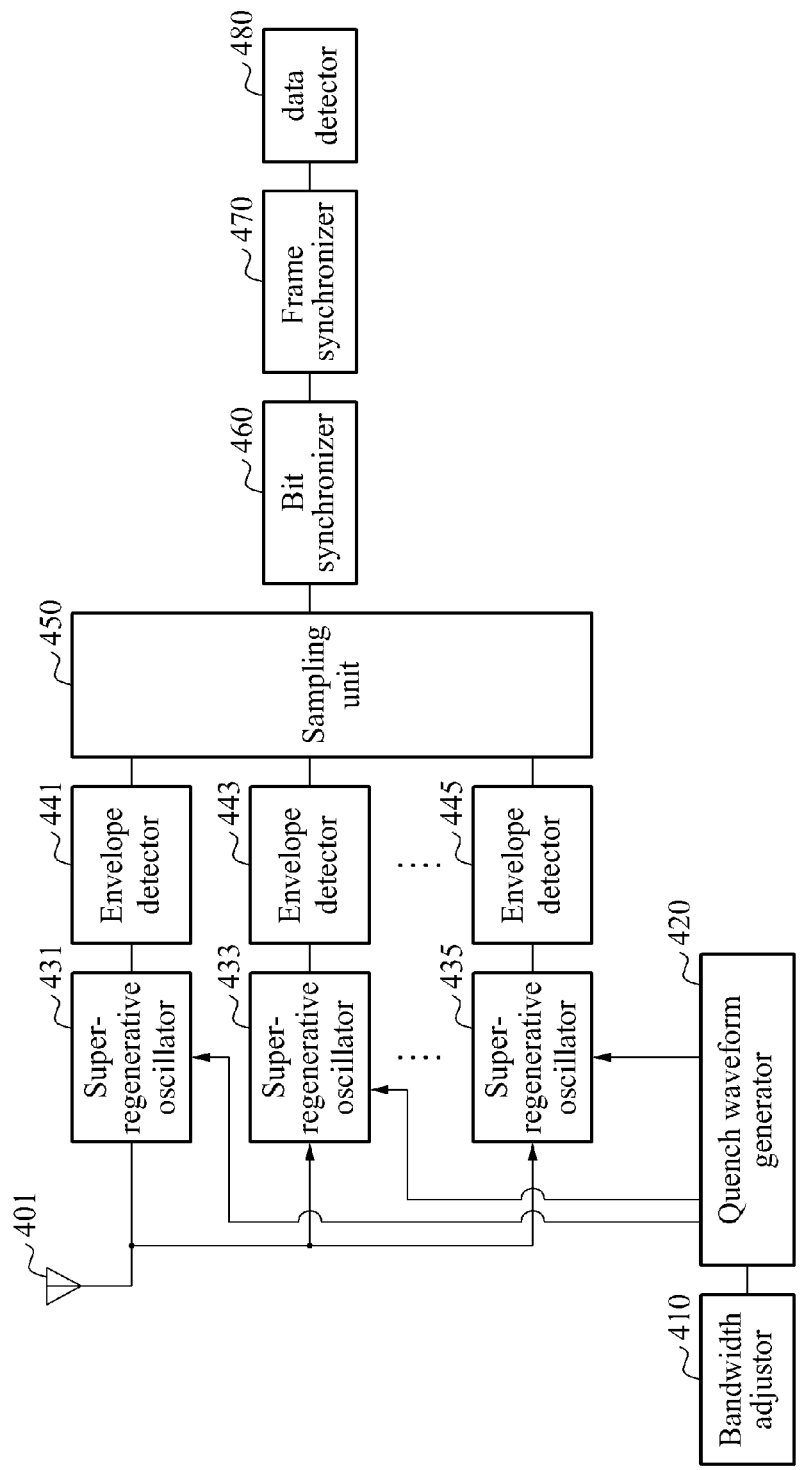
FIG. 4 is a block diagram illustrating an example of an ultra-low power super-regenerative receiver.

FIG. 4 illustrates an example of an ultra-low power super-regenerative receiver. The ultra-low power super-regenerative receiver includes a bandwidth adjustor 410, a quench waveform generator 420, super-regenerative oscillators (SROs), for example, a SRO 431, a SRO 433, and a SRO 435, envelope detectors, for example, an envelope detector 441, an envelope detector 443, and an envelope detector 445, a sampling unit 450, a bit synchronizer 460, a frame synchronizer 470, and a data detector 480.

The bandwidth adjustor 410 dynamically adjusts a bandwidth of a received signal based on a bandwidth of a transmitted signal. For example, the transmitted signal corresponds to a signal transmitted from a transmission end, and corresponds to a signal received at an antenna 401 and input into the SROs. The received signal corresponds to a signal output from the SROs.

The bandwidth adjustor 410 controls a period of a quench waveform, and controls an absolute value of a slope at a zero-crossing point of the quench waveform. The bandwidth adjustor 410 adjusts a shape of the quench waveform so that the period of the quench waveform increases, and the absolute value of the slope at the zero-crossing point of the quench waveform decreases. The quench waveform refers to a waveform generated by the quench waveform generator 420. For example, the quench waveform generator 420 may include a quench oscillator.

As an example, a period and an absolute value of a slope at a zero-crossing point of a damping function of each of the SROs is proportional to the period and the absolute value of the slope at the zero-crossing point of the quench waveform. In response to the period of the damping function increasing, and the absolute value of the slope at the zero-crossing point of the damping function decreasing, a width on a time axis of a sensitivity curve widens. In response to the width on the time axis of the sensitivity curve being widened, the bandwidth of the received signal decreases. Thus, by adjusting the width on the time axis of the sensitivity curve, the bandwidth of the received signal is adjusted to be similar to the bandwidth of the transmitted signal.

The quench waveform generator 420 generates as many quench waveforms as a number of over-samplings by delaying a reference quench waveform by a predetermined time interval. For example, in the reference quench waveform, the period and the absolute value of the slope at the zero-crossing point are controlled. The over-samplings refer to samplings performed to detect an envelope for each symbol duration time of the received signal.

In this example, when the predetermined time interval corresponds to $\Delta t$, and the number of over-samplings is three, the quench waveform generator 420 generates the reference quench waveform, a quench waveform delayed by $\Delta t$ from the reference quench waveform, and a quench waveform delayed by $2\Delta t$ from the reference quench waveform. In this example, a number of quench waveforms generated may be the same as a number of SROs and/or a number of envelope detectors.

The SRO 431 receives the reference quench waveform, and generates an oscillation signal in a symbol duration time of the received signal. For example, the oscillation signal is generated in a portion corresponding to the reference quench waveform.

The SRO 433 receives a quench waveform delayed by a predetermined time interval (e.g., $\Delta t$) from the reference quench waveform, and generates an oscillation signal in the symbol duration time of the received signal. For example, the oscillation signal is generated in a portion corresponding to the quench waveform delayed by the predetermined time interval.

The SRO 435 receives a quench waveform delayed by another predetermined time interval (e.g., $2\Delta t$) from the reference quench waveform, and generates an oscillation signal in the symbol duration time of the received signal. For example, the oscillation signal is generated in a portion corresponding to the quench waveform that is delayed by the other predetermined time interval. The oscillations signals generated by the SROs 431, 433, and 435 may be generated simultaneously.

The envelope detector 441 detects an envelope of the oscillation signal output from the SRO 431. The envelope detector 443 detects an envelope of the oscillation signal output from the SRO 433. The envelope detector 445 detects an envelope of the oscillation signal output from the SRO 435.

The sampling unit 450 samples and performs analog-to-digital conversion (ADC) on peak values of the detected envelopes from the envelope detectors 441, 443, and 445. For example, the bit synchronizer 460 may determine a correlation value between the ADC-sampled peak values and an original code sequence. In this example, the original code sequence refers to a code sequence processed based on a spreading factor in a direct sequence spread spectrum (DSSS) for a bit.

In another example, the bit synchronizer 460 may calculate the correlation value between the ADC-sampled peak values and a circularly-shifted code sequence. The circularly-shifted code sequence refers to a code sequence to which an original code sequence is moved in a chip unit.

The bit synchronizer 460 performs bit synchronization by estimating a pulse-level position and a code-level position including a maximum correlation value among the calculated correlation values. The pulse-level position refers to a position sampled from the envelope of the received signal, and the code-level position refers to a corresponding case between the original code sequence and the circularly-shifted code sequence.

The frame synchronizer 470 performs frame synchronization by detecting a predetermined bit sequence using an ADC value sampled through a quench waveform corresponding to the estimated pulse-level position. The frame synchronizer 470 determines that frame synchronization is performed when a bit sequence estimated through the ADC value matches the predetermined bit sequence.

The data detector 480 detects data using an ACD value sampled through the quench waveform corresponding to the estimated pulse-level position after the frame synchronization is completed. In more detail, after the frame synchronization is completed, a signal received thereafter includes data. The data detector 480 samples the received signal through the quench waveform that is determined through the bit synchronization, and detects the data from sampled values.

Figure 5:
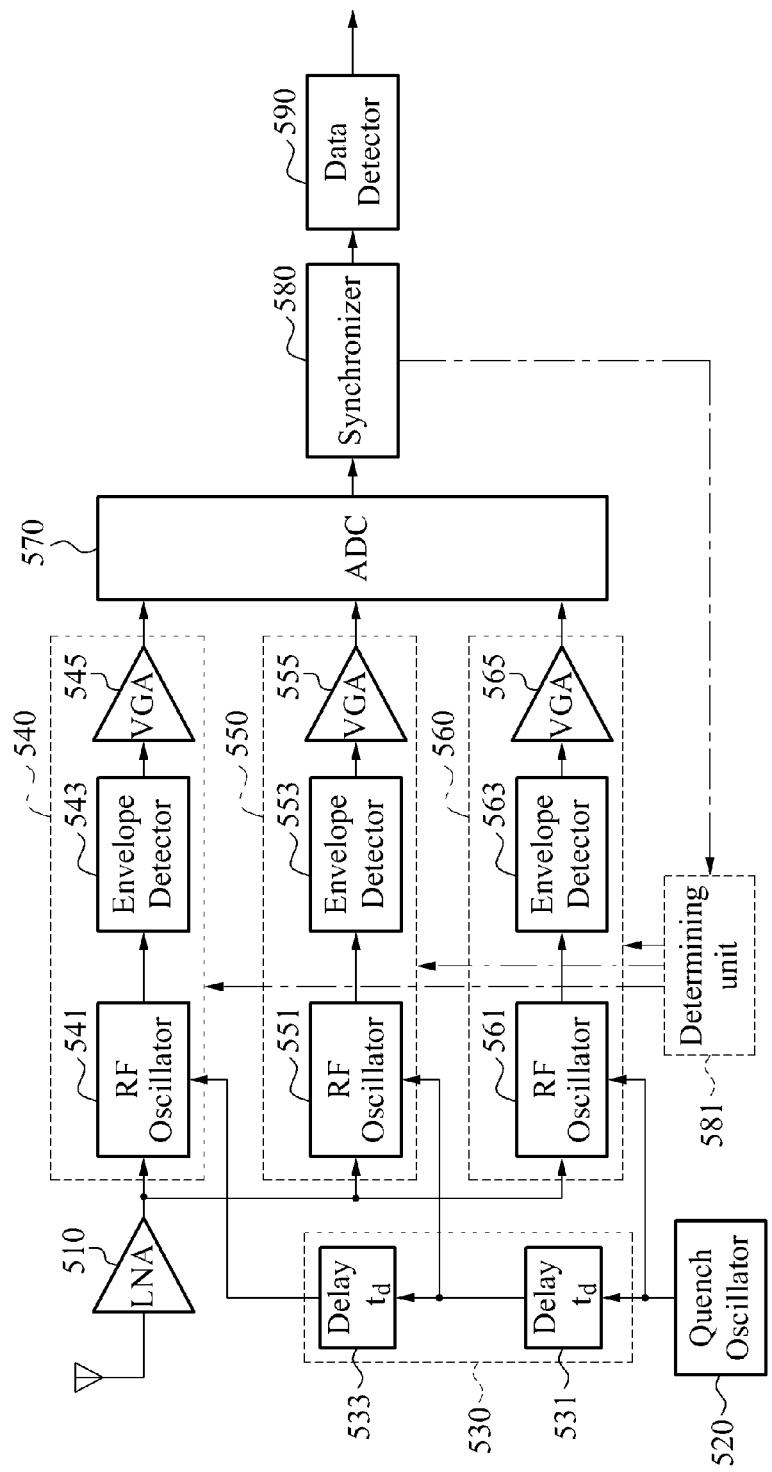
FIG. 5 is a block diagram illustrating an example of an ultra-low power super-regenerative receiver including a fixed periodic quench-parallel structure.

FIG. 5 illustrates an example of an ultra-low power super-regenerative receiver including a fixed periodic quench-parallel structure. Hereinafter, a fixed periodic quench-parallel scheme refers to a case in which an interval between zero-crossing points of a damping function is uniform. FIG. 5 shows to a case of performing three over-samplings for a single symbol duration time. The ultra-low power super-regenerative receiver uses as many parallel blocks 540, 550, and 560 as a number of over-samplings.

The ultra-low power super-regenerative receiver causes RF oscillators 541, 551, and 561 to concurrently oscillate using a quench waveform generated by a quench oscillator 520 and quench waveforms delayed from the quench waveform. A transmitted signal passing through a low noise amplifier (LNA) 510 is input into the RF oscillators 541, 551, and 561.

A quench waveform generator 530 generates a new quench waveform by delaying, by a period $t_d$ 531, the quench waveform generated by the quench oscillator 520. In this example, the new quench waveform is input into the RF oscillator 551. The quench waveform generator 530 generates a new quench waveform by delaying, by the period $t_d$ 531 and a period $t_d$ 533, the quench waveform generated by the quench oscillator 520. In this example, the new quench waveform is input into the RF oscillator 541.

Concurrently-oscillating oscillation signals pass through envelope detectors 543, 553, and 563 (including the functions of the envelope detectors 441, 443, and 445, respectively, of FIG. 4), and variable gain amplifiers (VGAs) 545, 555, and 565. An analog-digital converter (ADC) 570 obtains ADC sample values for peak values of each envelope, as described with reference to the sampling unit 450.

A synchronizer 580 performs synchronization of the ADC sample values. In more detail, the synchronizer 580 performs bit synchronization to perform synchronization on a time axis of a bit unit, and frame synchronization to perform synchronization of a bit sequence unit reporting a start of a frame.

A determining unit 581 determines parallel blocks (e.g., 540, 550, and 560) corresponding to a pulse-level position including a maximum correlation value calculated through the bit synchronization of the synchronizer 580. A data detector 590 detects data from a received signal after the frame synchronization is completed, as described with reference to the data detector 480.

Figure 6:
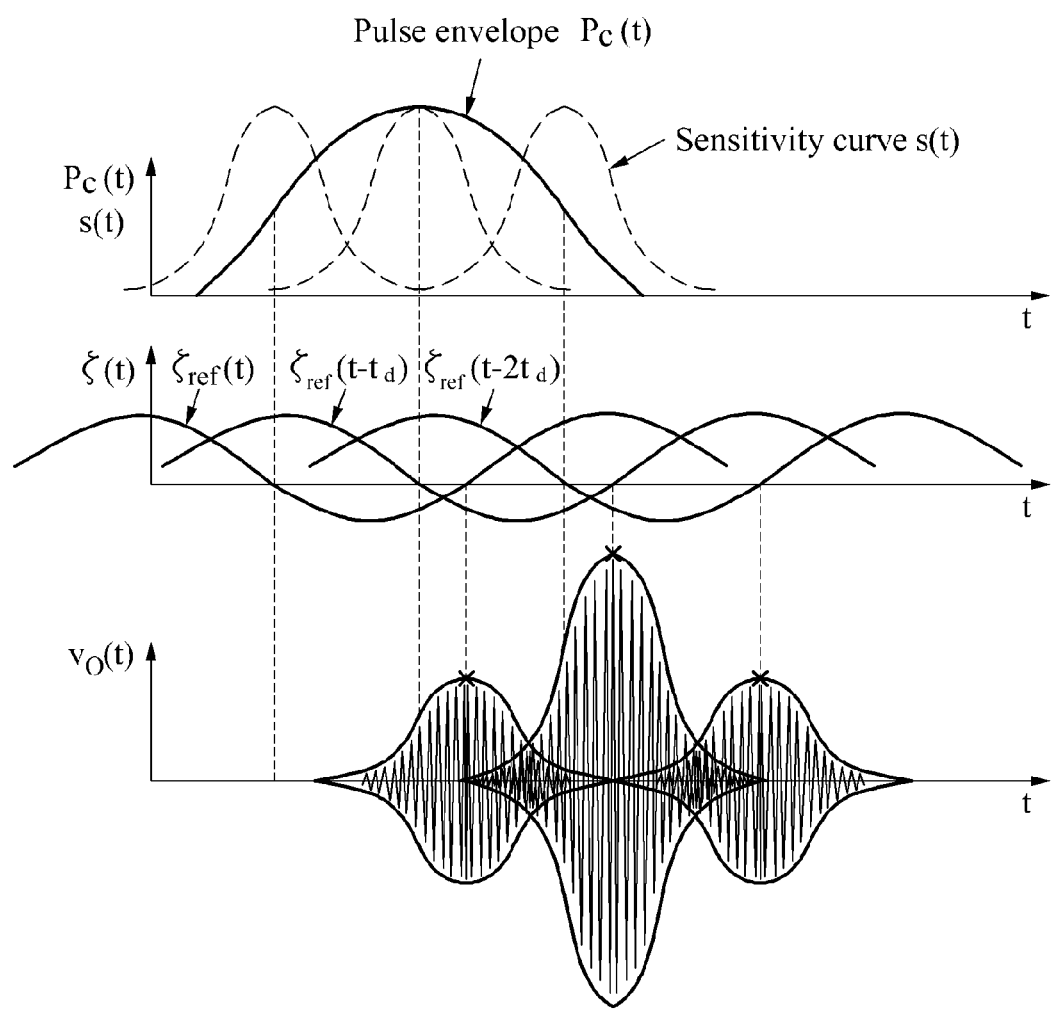
FIG. 6 is a series of graphs illustrating examples of an input signal, a damping function, and an output signal of a SRO in a fixed periodic quench-parallel structure.

FIG. 6 illustrates examples of an input signal (e.g., a pulse envelope $p_e(t)$ of the input signal), a damping function, and an output signal of a SRO in a fixed periodic quench-parallel structure. When a period of a damping function $\zeta(t)$ increases, and an absolute value of a slope at a zero-crossing point of the damping function decreases, a sensitivity curve $s(t)$ including a wide width on a time axis is acquired.

Referring to $s(t)=\exp(\omega_0\int_0^t \zeta(\lambda)d\lambda)$, as a variation of the damping function $\zeta(t)$ decreases for a predetermined time period at around $t=0$ corresponding to the zero-crossing point, a variation of a corresponding integrated value decreases, and a corresponding exponential value either decreases or increases, slowly. When the damping function $\zeta(t)$ at the zero-crossing point linearly varies, a time width of the sensitivity curve $s(t)$ is approximately inverse proportional to a square root of the absolute value of the slope at the zero-crossing point of the damping function $\zeta(t)$.

The damping function $\zeta(t)$ may be calculated by the following:

$$\zeta(t)=\zeta_0(1-K_0K_a(t)). \qquad (1)$$

In this example, $\zeta_0$ denotes a quiescent damping factor, $K_0$ denotes a constant value corresponding to a maximum amplification in a transfer function of a selective network, and $K_a(t)$ denotes a variable gain of a feedback amplifier adjusted by a quench waveform. In response to a period of the quench waveform increasing, and an absolute value of a slope at a zero-crossing point of the quench waveform decreasing, $K_a(t)$ is slowly varied over time, thereby allowing for the damping function $\zeta(t)$ to become a signal that slowly varies over time.

An ultra-low power super-regenerative receiver generates quench waveforms including a relatively long period, and performs relatively accurate synchronization of a symbol using samples sampled in a single symbol duration time. Referring to FIG. 6, the ultra-low power super-regenerative receiver performs three samplings in a single symbol duration time using three damping functions $\zeta_{ref}(t)$, $\zeta_{ref}(t-t_d)$, and $\zeta_{ref}(t-2t_d)$. For example, an over-sampling rate is 3 hertz (Hz). However, an over-sampling is performed a varying numbers of times. For each different damping function, an SRO output signal $v_o(t)$ including different peak values at different positions in a single symbol duration time is generated. $\zeta_{ref}(t)$ denotes a reference damping function, and $\zeta_{ref}(t-t_d)$ and $\zeta_{ref}(t-2t_d)$ denote damping functions obtained by delaying $\zeta_{ref}(t)$ by a time value $t_d$ and a time value $2t_d$ on a time axis, respectively.

Among waveforms of the SRO output signal $v_o(t)$, a waveform including a greatest peak value corresponds to a waveform generated by the damping function $\zeta_{ref}(t-t_d)$. A waveform on a left side of the waveform including the greatest peak value and a waveform on a right side of the waveform including the greatest peak value correspond to waveforms generated by the damping functions $\zeta_{ref}(t)$ and $\zeta_{ref}(t-2t_d)$, respectively. Since damping functions including different delay times is not generated at the same time in a single quench oscillator, a parallel structure generating each quench waveform in parallel is used.

Figure 7:
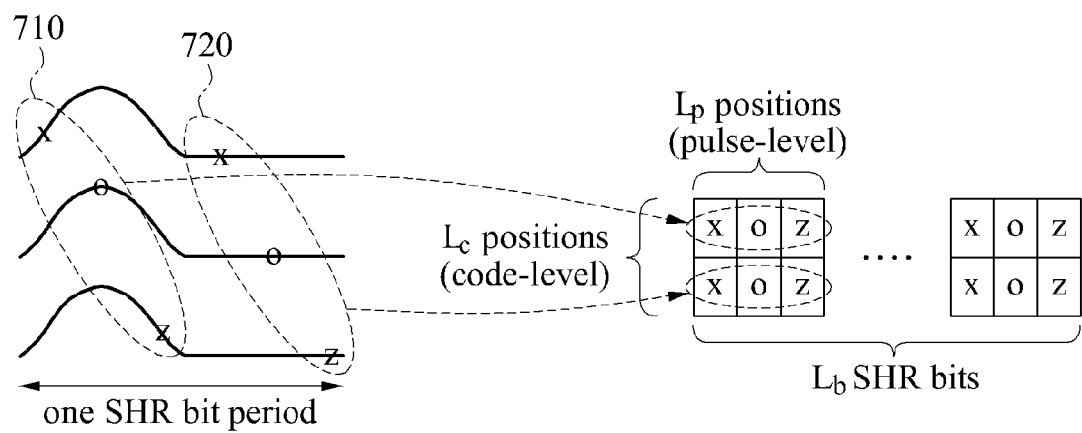
FIG. 7 is a diagram illustrating an example of bit synchronization in a fixed periodic quench-parallel structure.

FIG. 7 illustrates an example of bit synchronization in a fixed periodic quench-parallel structure. Referring to FIG. 7, a DSSS is used, a spreading factor is 2, and a spreading code sequence corresponds to [1 0]. Further, three over-samplings are performed in a single chip duration time.

Waveforms at a far left of FIG. 7 illustrate ADC values sampled at different time points through three quench waveforms of different delay times, of an RF input envelope during a bit period of a single Sync Header (SHR). For example, positions according to different quench waveforms correspond to different pulse-level positions.

An ultra-low power super-regenerative receiver obtains a correlation value for sample values corresponding to each pulse-level ($L_p$) position (x, o, z), an original code sequence 710, and a circularly-shifted code sequence 720. For example, positions corresponding to the original code sequence 710 and the circularly shifted code sequence 720 correspond to code-level ($L_c$) positions. In response to a maximum correlation value being calculated, and a pulse-level position (x, o, z) and a code-level position being estimated, a position of a sampling and a position of a code sequence is determined.

The correlation value is repeatedly calculated in bit symbol duration times $L_b$ SHR bits, and an average value obtained by dividing a calculated correlation value by a corresponding number of bits is used for bit synchronization. The ultra-low power super-regenerative receiver calculates the correlation value including a greatest value, and estimates the pulse-level position and the code-level position corresponding to the correlation value, thereby completing the bit synchronization. A quench waveform corresponding to the estimated pulse-level position corresponds to a quench waveform ultimately selected in a bit synchronization process.

The ultra-low power super-regenerative receiver performs frame synchronization using an ADC value sampled through the quench waveform selected in the bit synchronization process. The frame synchronization detects a predetermined bit sequence by performing the bit synchronization process a predetermined number of times. After the frame synchronization is completed, a data detection signal processing is performed using the ADC value sampled through the quench waveform selected in the bit synchronization process.

Figure 8:
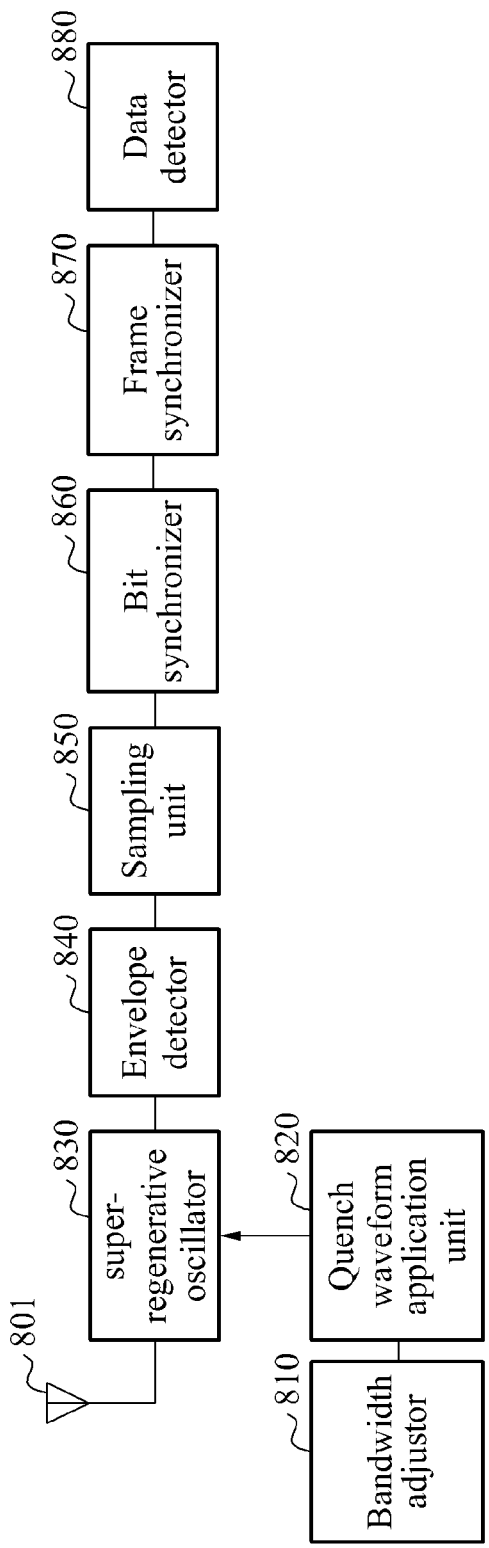
FIG. 8 is a block diagram illustrating another example of an ultra-low power super-regenerative receiver.

FIG. 8 illustrates another example of an ultra-low power super-regenerative receiver. The ultra-low power super-regenerative receiver includes a bandwidth adjustor 810, a quench waveform application unit 820, a super-regenerative oscillator (SRO) 830, an envelope detector 840, a sampling unit 850, a bit synchronizer 860, a frame synchronizer 870, and a data detector 880.

The bandwidth adjustor 810 dynamically adjusts a bandwidth of a received signal based on a bandwidth of a transmitted signal received through an antenna 801. The bandwidth adjustor 810 generates a quench waveform, controls a period of the quench waveform, and controls an absolute value of a slope at a zero-crossing point of the quench waveform. For example, the bandwidth adjustor 810 adjusts a shape of the quench waveform so that the period of the quench waveform increases, and the absolute value of the slope at the zero-crossing point of the quench waveform decreases.

The quench waveform application unit 820 applies, to the SRO 830, the quench waveform during a first time period in a bit symbol duration time, and applies, to the SRO 830, the quench waveform during a third time period after a second time period of time delay in a bit symbol duration time. The bandwidth adjustor 810 controls the period and the absolute value of the slope at the zero-crossing point of the quench waveform.

The quench waveform application unit 820 repeatedly applies, to the SRO 830, the quench waveform during the first time period, and does not apply the quench waveform during the second time period based on an over-sampling rate. For example, an over-sampling rate of 3 Hz indicates three different pulse-level positions. ADC values are acquired for a single predetermined pulse-level position in a single bit symbol duration time. Thus, to acquire all sampling values for the three different pulse-level positions, at least three bit symbol duration times are used.

The SRO 830 receives the quench waveform during the first time period, and does not receive the quench waveform during the second time period based on the operation of the quench waveform application unit 820. Accordingly, an oscillation signal is not generated during the second time period in which the quench waveform is not input into the SRO 830. The SRO 830 generates an oscillation signal based on the quench waveform and the transmitted signal received through the antenna 801 during the first time period.

The envelope detector 840 detects an envelope of the oscillation signal output from the SRO 830. The sampling unit 850 ADC samples peak values of the detected envelope.

In examples, the bit synchronizer 860 may determine a correlation value between the ADC-sampled peak values and an original code sequence. The bit synchronizer 860 may determine a correlation value between the ADC-sampled peak values and a circularly-shifted code sequence. The bit synchronizer 860 performs bit synchronization by estimating a pulse-level position and a code-level position including a maximum correlation value between the determined correlation values.

The frame synchronizer 870 performs frame synchronization by detecting a predetermined bit sequence using an ADC value sampled through a quench waveform corresponding to the estimated pulse-level position. The frame synchronizer 870 determines that frame synchronization is performed when a bit sequence estimated through the ADC value matches the predetermined bit sequence. The data detector 880 detects data using the ADC value sampled through the quench waveform corresponding to the estimated pulse-level position after the frame synchronization is completed.

Figure 9:
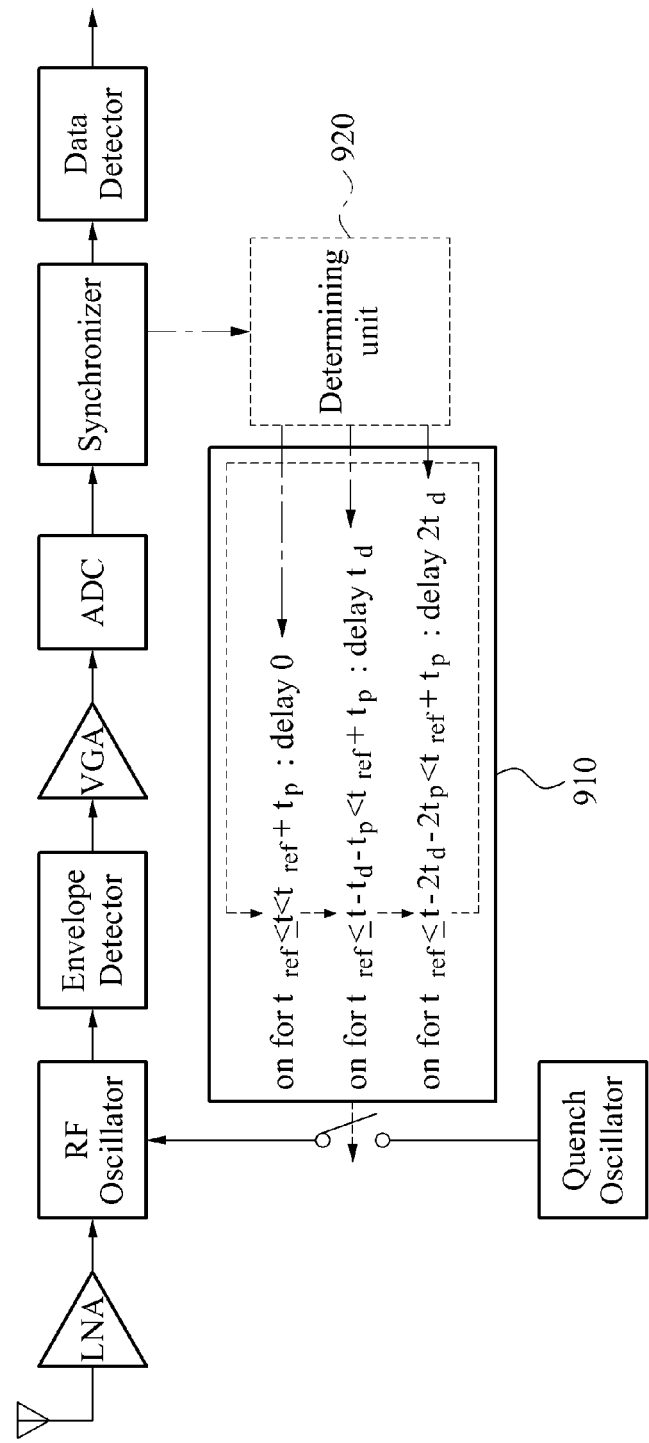
FIG. 9 is a block diagram illustrating an example of an ultra-low power super-regenerative receiver including a fixed periodic quench-serial structure.

FIG. 9 illustrates an example of an ultra-low power super-regenerative receiver including a fixed periodic quench-serial structure. FIG. 9 shows a case of performing three over-samplings for a single symbol duration time. A number of times of repeating a delay $t_d$ is set to a number of over-samplings.

A quench waveform application unit 910 repeatedly applies, to an RF oscillator, a quench waveform acquired from a single quench oscillator during a predetermined time period $t_p$, does not apply the quench waveform during the predetermined time period $t_p$, and applies the quench waveform during the predetermined time period $t_p$, so that a sampling is performed at a subsequent position. In this example, $t_{ref}$ denotes a point in time at which applying of the quench waveform is started.

A synchronizer performs synchronization for ADC values. The synchronizer performs bit synchronization to perform synchronization on a time axis of a bit unit, and performs frame synchronization to perform synchronization of a bit sequence unit reporting a start of a frame. A determining unit 920 determines a quench waveform corresponding to a pulse-level position including a maximum correlation value calculated through a bit synchronization process of the synchronizer based on the maximum correlation value.

Figure 10:
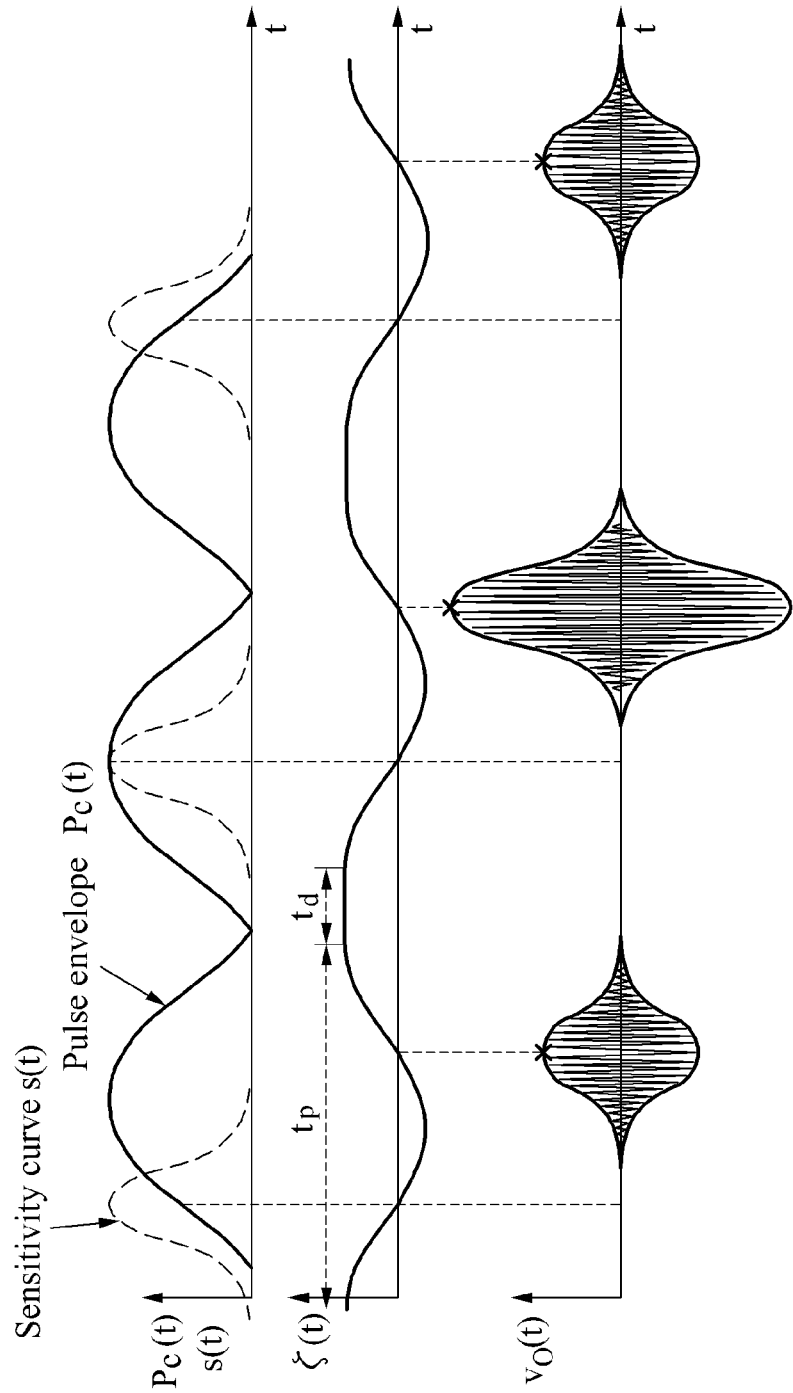
FIG. 10 is a series of graphs illustrating examples of an input signal, a damping function, and an output signal of a SRO in a fixed periodic quench-serial structure.

FIG. 10 illustrates examples of an input signal (e.g., a pulse envelope $p_c(t)$ of the input signal), a damping function, and an output signal of an SRO in a fixed periodic quench-serial structure. FIG. 10 shows a case in which a transmission bit "1" is transmitted in a continuously-repeated manner, and a signal processing to acquire samplings at three different positions in a single bit symbol duration time.

When a period of a damping function $\zeta(t)$ increases, and an absolute value of a slope at a zero-crossing point of the damping function decreases, a sensitivity curve s(t) (of pulse envelope including a relatively wide width on a time axis is acquired. To acquire samplings at different positions in a single symbol duration time, an ultra-low power super-regenerative receiver applies, to an output signal $v_o(t)$ of the SRO, a quench waveform for a predetermined time period $t_p$, and then applies the quench waveform after a time delay $t_d$ of the predetermined time period $t_p$.

A time period during which the damping function $\zeta(t)$ holds a predetermined positive value for the predetermined time period $t_p$ corresponds to a time period during which the quench waveform holds a zero value, which corresponds to a time period during which the quench waveform is not applied to the SRO. The ultra-low power super-regenerative receiver repeatedly performs a time delay based on an over-sampling rate to be used.

Unlike a parallel structure scheme of FIG. 6, a serial structure scheme successively performs an operation of the damping function through adjusting the quench waveform rather than simultaneously performing the operation of the damping function. When compared to the parallel structure scheme, the serial structure scheme uses a longer period of time in acquiring the same number of ADC samples. However, this reduces a complexity of hardware and an ADC sampling rate, and thus, power consumption is lowered.

Figure 11:
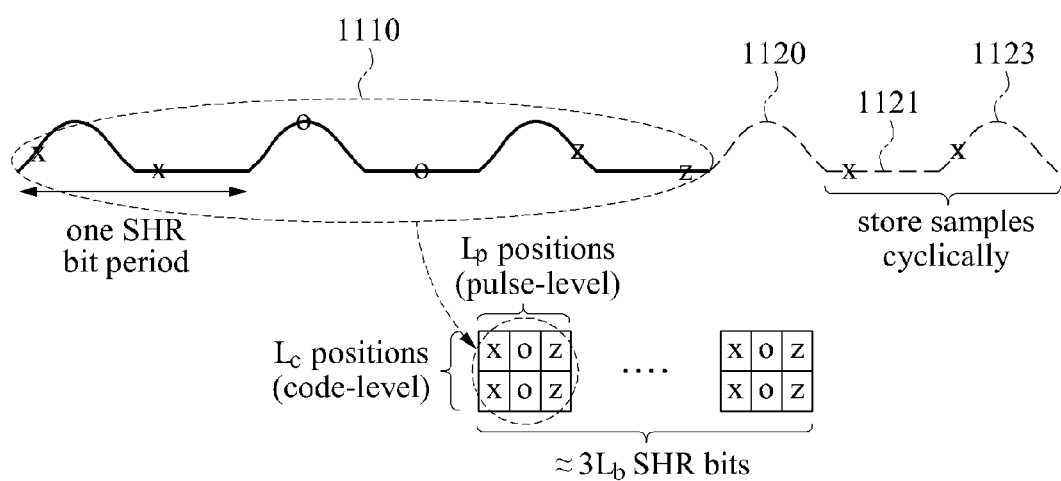
FIG. 11 is a diagram illustrating an example of bit synchronization in a fixed periodic quench-serial structure.

FIG. 11 illustrates an example of bit synchronization in a fixed periodic quench-serial structure. Referring to FIG. 11, a DSSS is used, a spreading factor is 2, and a spreading code sequence corresponds to [1 0]. Further, three over-samplings are performed in a single chip duration time.

A waveform on a far left of FIG. 11 illustrates ADC values sampled at different pulse-level positions through a delay time and an ON/OFF state of a quench waveform of an RF input envelope 1110 during a bit period of three SHRs. An ultra-low power super-regenerative receiver determines a correlation value for sample values corresponding to each pulse-level position (x, o, z), an original code sequence, and a circularly-shifted code sequence.

In bit symbol duration times, the correlation value is repeatedly determined. However, to repeatedly determine the correlation value, the following signal processing scheme is used.

After samplings at all pulse-level positions are completed, the ultra-low power super-regenerative receiver adjusts the ON/OFF state of the quench waveform so that a sampling is omitted in a following symbol duration time 1120, and is performed in a subsequent symbol duration time. In this example, a symbol duration time may refer to a duration time in a chip unit.

A sampling is omitted in the symbol duration time 1120 so that a sensitivity curve is not be overlapped when repeatedly performing a sampling at the same pulse-level positions 1121 and 1123 after performing a sampling at an initial pulse-level position. From a sample after a symbol duration time is omitted, a code sequence appears in a form of a circularly-shifted position based on an initial position, which is considered when calculating a correlation value. For example, after an ADC value is stored in a memory in a circularly-shifted form, the ADC value is correlated with the code sequence. When a spreading factor corresponds to 1, the symbol duration time may not be omitted.

When a correlation value is calculated in several bit periods for a predetermined pulse-level position, an average value obtained by dividing the calculated correlation value by the corresponding number of bits, may be used for bit synchronization. The ultra-low power super-regenerative receiver determines a correlation value including a greatest value, and estimate a pulse-level position and a code-level position corresponding to the calculated correlation value, thereby completing the bit synchronization. Further, the ultra-low power super-regenerative receiver may apply, to a quench waveform used for a sampling, information about a time delay of a quench waveform corresponding to the estimated pulse-level position.

The ultra-low power super-regenerative receiver performs frame synchronization using an ADC value sampled through a quench waveform selected in a bit synchronization process. The frame synchronization detects a predetermined bit sequence by performing the bit synchronization process a predetermined number of times. After the frame synchronization is completed, a data detection signal processing is performed using the ADC value sampled through the quench waveform selected in the bit synchronization process.

Figure 12:
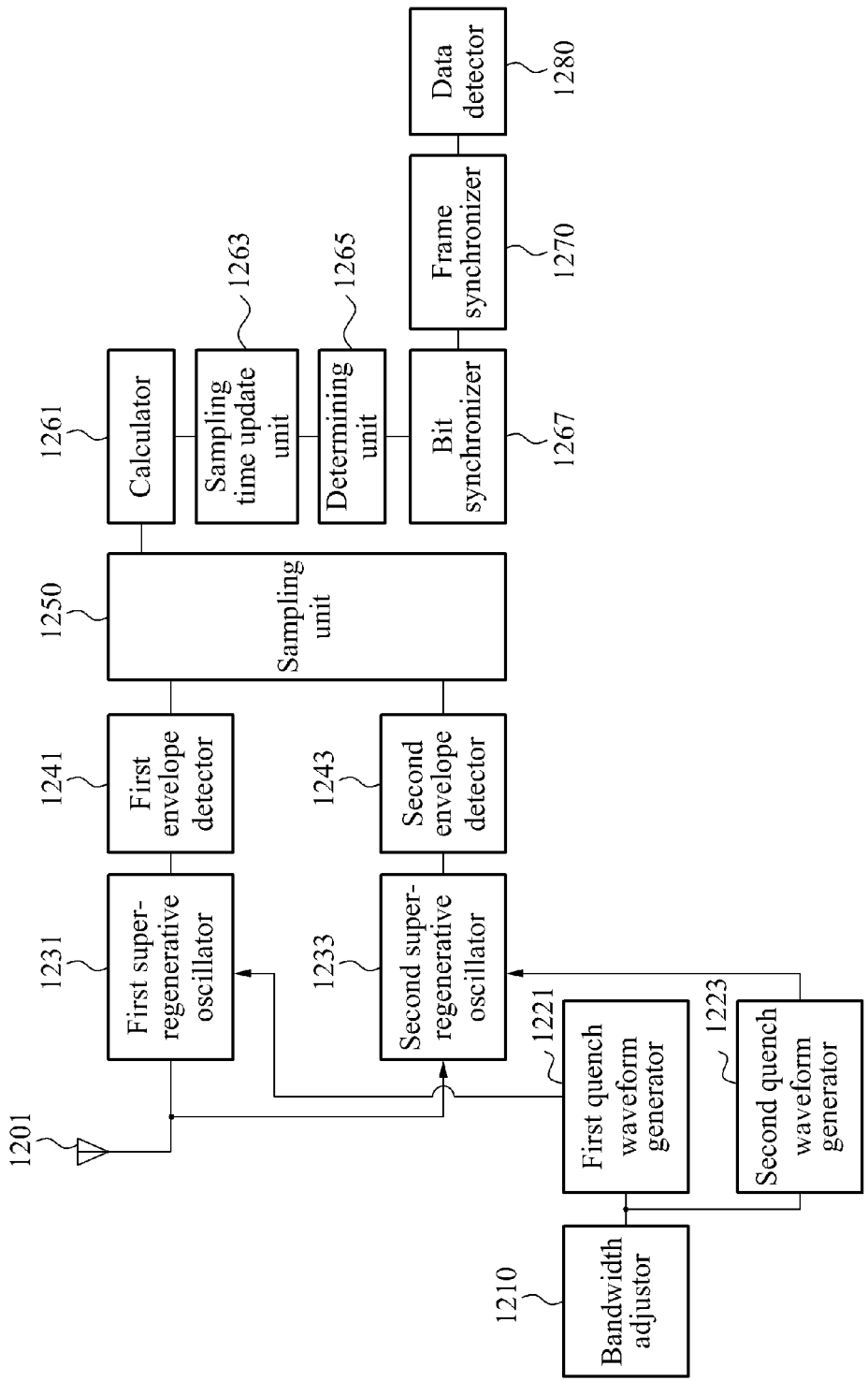
FIG. 12 is a block diagram illustrating still another example of an ultra-low power super-regenerative receiver.

FIG. 12 illustrates still another example of an ultra-low power super-regenerative receiver. The ultra-low power super-regenerative receiver includes a bandwidth adjustor 1210, a first quench waveform generator 1221, a second quench waveform generator 1223, a first super-regenerative oscillator (SRO) 1231, a second super-regenerative oscillator (SRO) 1233, a first envelope detector 1241, a second envelope detector 1243, a sampling unit 1250, a calculator 1261, a sampling time update unit 1263, a determining unit 1265, a bit synchronizer 1267, a frame synchronizer 1270, and a data detector 1280.

The bandwidth adjustor 1210 dynamically adjusts a bandwidth of a received signal based on a bandwidth of a transmitted signal received through an antenna 1201. The bandwidth adjustor 1210 generates a quench waveform, controls a period of a quench waveform to be generated, and controls an absolute value of a slope at a zero-crossing point of the quench waveform. For example, the bandwidth adjustor 1210 adjusts a shape of the quench waveform so that the period of the quench waveform increases, and the absolute value of the slope at the zero-crossing point of the quench waveform decreases.

The first quench waveform generator 1221 generates a first quench waveform delayed by a predetermined time interval based on an initial sampling time of the quench waveform. The bandwidth adjustor 120 controls the period and the absolute value of the slope at the zero-crossing point of the quench waveform. The second SRO 1233 generates a second quench waveform advanced by a predetermined time interval based on the initial sampling time of the quench waveform.

The first SRO 1231 generates a first oscillation signal based on the first quench waveform in a symbol duration time of the transmitted signal received through the antenna 1201. The second SRO 1233 generates a second oscillation signal based on the second quench waveform in a symbol duration time of the transmitted signal received through the antenna 1201.

The first envelope detector 1241 detects an envelope of the first oscillation signal. The second envelope detector 1243 detects an envelope of the second oscillation signal.

The sampling unit 1250 ADC samples peak values of the envelope of the first oscillation signal and of the envelope of the second oscillation signal. The calculator 1261 calculates a correlation value between the ADC-sampled peak values and an original code sequence. The calculator 1261 further calculates a correlation value between the ADC-sampled peak values and a circularly-shifted code sequence.

The calculator 1261 further calculates a correlation value including a greatest value in each pulse-level position. Since two pulse-level positions are included, the calculator 1261 may calculate a correlation value including a greatest value between the two pulse-level positions.

The sampling time update unit 1263 adjusts the initial sampling time based on a difference between a first correlation value calculated at a pulse-level position that is temporally advanced and a second correlation value calculated at a pulse-level position that is temporally delayed. The first correlation value may refer to a correlation value corresponding to a greatest value among values calculated at a pulse-level position that is temporally advanced, and the second correlation value may refer to a correlation value corresponding to a greatest value among values calculated at a pulse-level position that is temporally delayed.

In response to the difference between the first correlation value and the second correlation value being greater than "0", the sampling time update unit 1263 decreases the initial sampling time by a predetermined time interval. In response to the difference between the first correlation value and the second correlation value being less than "0", the sampling time update unit 1263 increases the initial sampling time by a predetermined time interval. In response to the difference between the first correlation value and the second correlation value being "0", the sampling time update unit 1263 maintains the initial sampling time.

The determining unit 1265 determines, to be an optimal sampling time, a sampling time in which an absolute value of the difference between the first correlation value and the second correlation value is less than a predetermined value. In response to the operation of determining the optimal sampling time being repeated a maximum number of times set to a predetermined value, the determining unit 1265 determines, to be the optimal sampling time, a sampling time satisfying the maximum number of times.

The bit synchronizer 1267 performs bit synchronization by estimating a pulse-level position corresponding to the optimal sampling time, and by estimating, as a code-level position, a circularly-shifted code sequence including a greatest value. The frame synchronizer 1270 performs frame synchronization by detecting a predetermined bit sequence using an ADC value sampled through a quench waveform to which the optimal sampling time is applied. The data detector 1280 detects data using the ADC value sampled through the quench waveform to which the optimal sampling time is applied after the frame synchronization is completed.

Figure 13:
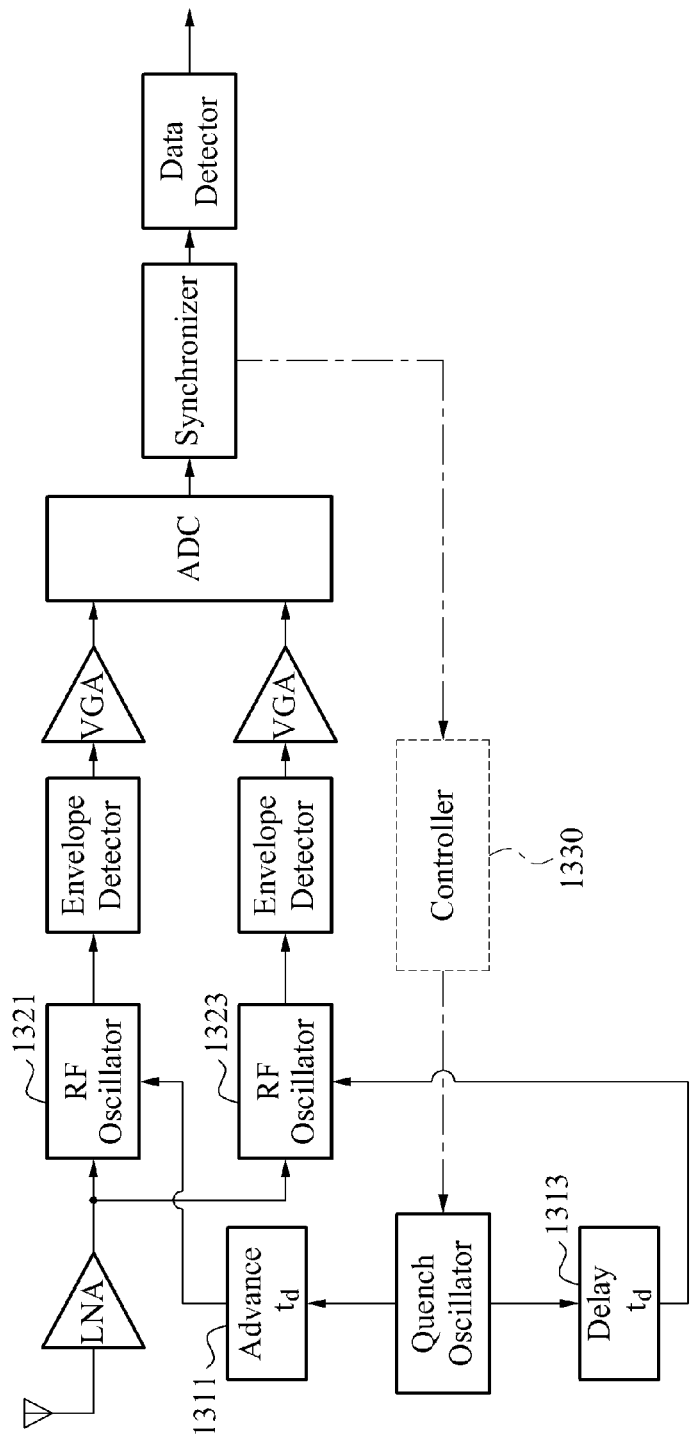
FIG. 13 is a block diagram illustrating an example of an ultra-low power super-regenerative receiver including an adaptive periodic quench-parallel structure.

FIG. 13 illustrates an example of an ultra-low power super-regenerative receiver including an adaptive periodic quench-parallel structure. An adaptive periodic quench scheme refers to a case in which an interval between zero-crossing points of a damping function is not uniform, and is adjusted according to a circumstance.

Referring to FIG. 5, the ultra-low power super-regenerative receiver causes the RF oscillators 541, 551, and 561 to concurrently oscillate using a quench waveform generated by the quench oscillator 520 and quench waveforms delayed from the quench waveform.

In FIG. 13, the ultra-low power super-regenerative receiver causes an RF oscillator 1321 to concurrently oscillate using a quench waveform advanced by an advance time $t_d$ 1311 from a single quench waveform generated by a quench oscillator. The ultra-low power super-regenerative receiver causes a RF oscillator 1323 to concurrently oscillate further using a quench waveform delayed by a delay time $t_d$ 1313 from the single quench waveform generated by the quench oscillator.

Oscillation signals oscillated from each of the RF oscillators 1321 and 1323 pass through different envelope detectors and different VGAs. An ADC obtains ADC-sampled peak values of each envelope.

A synchronizer performs synchronization for the ADC-sampled values. The synchronizer performs bit synchronization to perform synchronization on a time axis of a bit unit, and frame synchronization to perform synchronization of a bit sequence unit reporting a start of a frame.

A controller 1330 controls an optimal sampling time determined through the bit synchronization process of the synchronizer and through a timing of a quench waveform generated by the quench oscillator. In this example, a data detector detects data from a received signal after the frame synchronization is completed.

Figure 14:
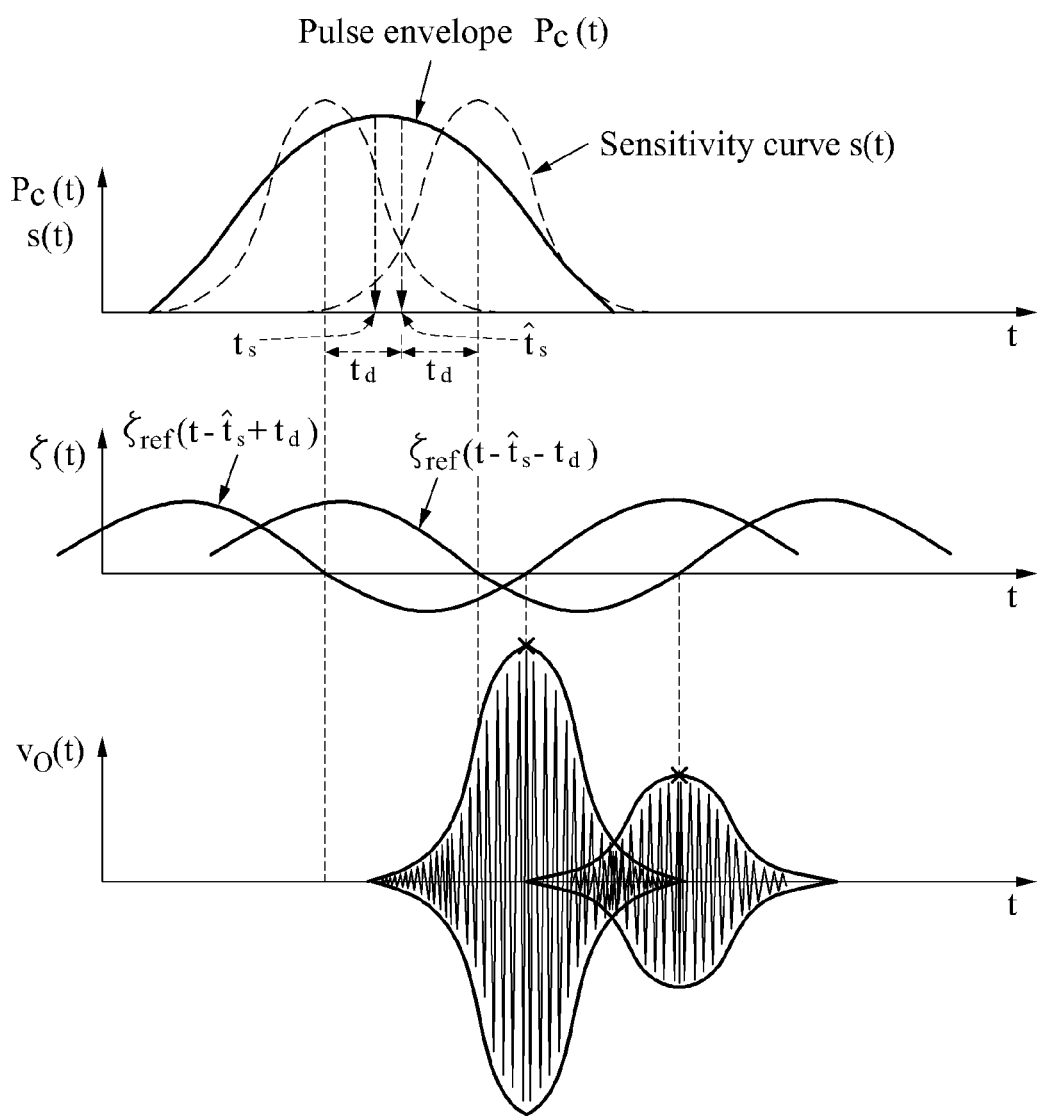
FIG. 14 is a series of graphs illustrating examples of an input signal, a damping function, and an output signal of a SRO in an adaptive periodic quench-parallel structure.

FIG. 14 illustrates an example of an input signal (e.g., a pulse envelope $p_c(t)$ and a sensitivity curve $s(t)$ of the input signal), a damping function $\zeta(t)$, and an output signal $v_o(t)$ of a super-regenerative oscillator (SRO) in an adaptive periodic quench-parallel structure. The ultra-low power super-regenerative receiver obtains ADC samples at different positions using damping functions including different delay times. For example, the ultra-low power super-regenerative receiver may use two damping functions including different delay times, and thus, an ADC sampling rate in a single symbol duration time may be 2 Hz.

The ultra-low power super-regenerative receiver performs a substantially optimal retrieval for a pulse-level position by precisely adjusting a delay time $\hat{t}_s$ for a reference damping function $\zeta_{ref}(t-\hat{t}_s)$. A value $t_d$ corresponding to a time advanced or delayed based on the reference damping function $\zeta_{ref}(t-\hat{t}_s)$ remains constant. That is, the ultra-low power super-regenerative receiver performs substantially optimal synchronization using two different damping functions.

Figure 15:
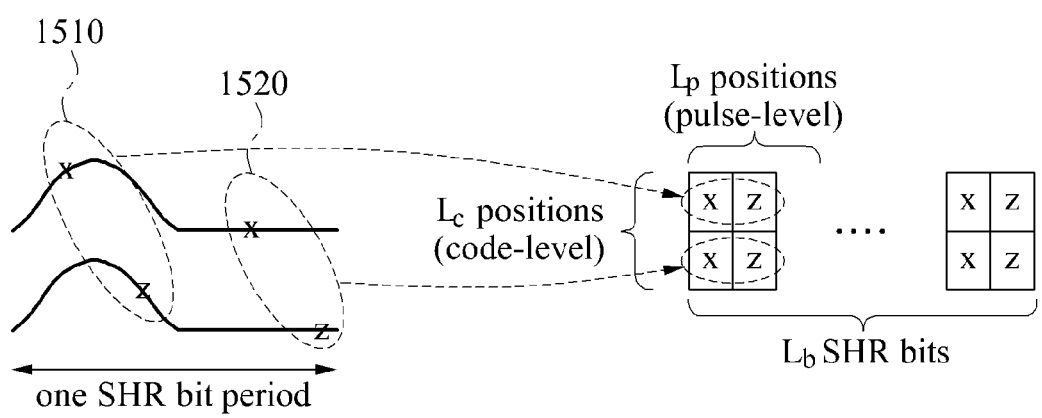
FIG. 15 is a diagram illustrating an example of bit synchronization in an adaptive periodic quench-parallel structure.

FIG. 15 illustrates an example of bit synchronization in an adaptive periodic quench-parallel structure. Referring to FIG. 15, a DSSS is used, a spreading factor is 2, and a spreading code sequence corresponds to [1 0].

Waveforms at the far left of FIG. 15 illustrate ADC values sampled at different time points of two quench waveforms of different delay times on an RF input envelope during a bit period of a single SHR. For example, positions of the quench waveforms refer to pulse-level positions.

An ultra-low power super-regenerative receiver determines a correlation value for the sampled values corresponding to each pulse-level ($L_p$) position (x, z), an original code sequence 1510, and a circularly-shifted code sequence 1520. The correlation value is repeatedly calculated in bit symbol duration times $L_b$ SHR bits, and an average value is obtained by dividing the calculated correlation value by the corresponding number of bits, which is used for bit synchronization.

The ultra-low power super-regenerative receiver calculates correlation values including a greatest value at each pulse-level position separately. For example, a correlation value at a pulse-level position that is temporally advanced, that is, a correlation value obtained by a damping function $\zeta_{ref}(t-\hat{t}_s+t_d)$, may be referred to as a value $R(t_d)$. A correlation value at a pulse-level position that is temporally delayed, that is, a correlation value obtained by a damping function $\zeta_{ref}(t-\hat{t}_s-t_d)$, may be referred to as a value $R(-t_d)$.

When a difference between the correlation values, e.g., $R_{diff}=R(t_d)-R(-t_d)$, is greater than "0", the ultra-low power super-regenerative receiver decreases a delay time $\hat{t}_s$ of a reference damping function $\zeta_{ref}(t-\hat{t}_s)$ by a constant positive value $\Delta_s$. In this example, the constant positive value $\Delta_s$ may be properly adjusted so that a timing may be delicately adjusted.

When the difference between the correlation values, e.g., $R_{diff}=R(t_d)-R(-t_d)$, is less than "0", the ultra-low power super-regenerative receiver increases the delay time $\hat{t}_s$ by the constant positive value $\Delta_s$. When an absolute value of the difference $R_{diff}$ between the correlation values $R(t_d)$ and $R(-t_d)$ is relatively large, the ultra-low power super-regenerative receiver multiplies a relatively large integer by the constant positive value $\Delta_s$, thereby increasing a variation of the delay time $\hat{t}_s$.

As a first requirement, the ultra-low power super-regenerative receiver updates the correlation value $R(t_d)$ and the correlation value $R(-t_d)$ until the absolute value of the difference $R_{diff}$ between the correlation values $R(t_d)$ and $R(-t_d)$ is less than a value $\tau_R$ set to a predetermined value, and accordingly adjusts the delay time $\hat{t}_s$. As a second requirement, the ultra-low power super-regenerative receiver further updates the correlation values R($t_d$) and R($-t_d$) until a maximum number of iterations set to a predetermined value is satisfied, and accordingly adjust the delay time $\hat{t}_s$.

In response to the first requirement or the second requirement being satisfied, the ultra-low power super-regenerative receiver terminates an adjusting operation of a sampling time, and sets, to a pulse-level position, the adjusted delay time $\hat{t}_s$.

The ultra-low power super-regenerative receiver completes bit synchronization by mapping a circularly-shifted code sequence corresponding to a maximum correlation value, to a code-level ($L_c$) position. The reference damping function $\zeta_{ref}(t-\hat{t}_s)$ to which the adjusted delay time $\hat{t}_s$ is applied may correspond to a quench waveform selected in the bit synchronization process.

The ultra-low power super-regenerative receiver performs frame synchronization using an ADC value sampled through the quench waveform selected in the bit synchronization process. The frame synchronization detects a predetermined bit sequence by performing the bit synchronization process a predetermined number of times. After the frame synchronization is completed, a data detection signal processing is performed using the ADC value sampled through the quench waveform selected in the bit synchronization process.

Figure 16:
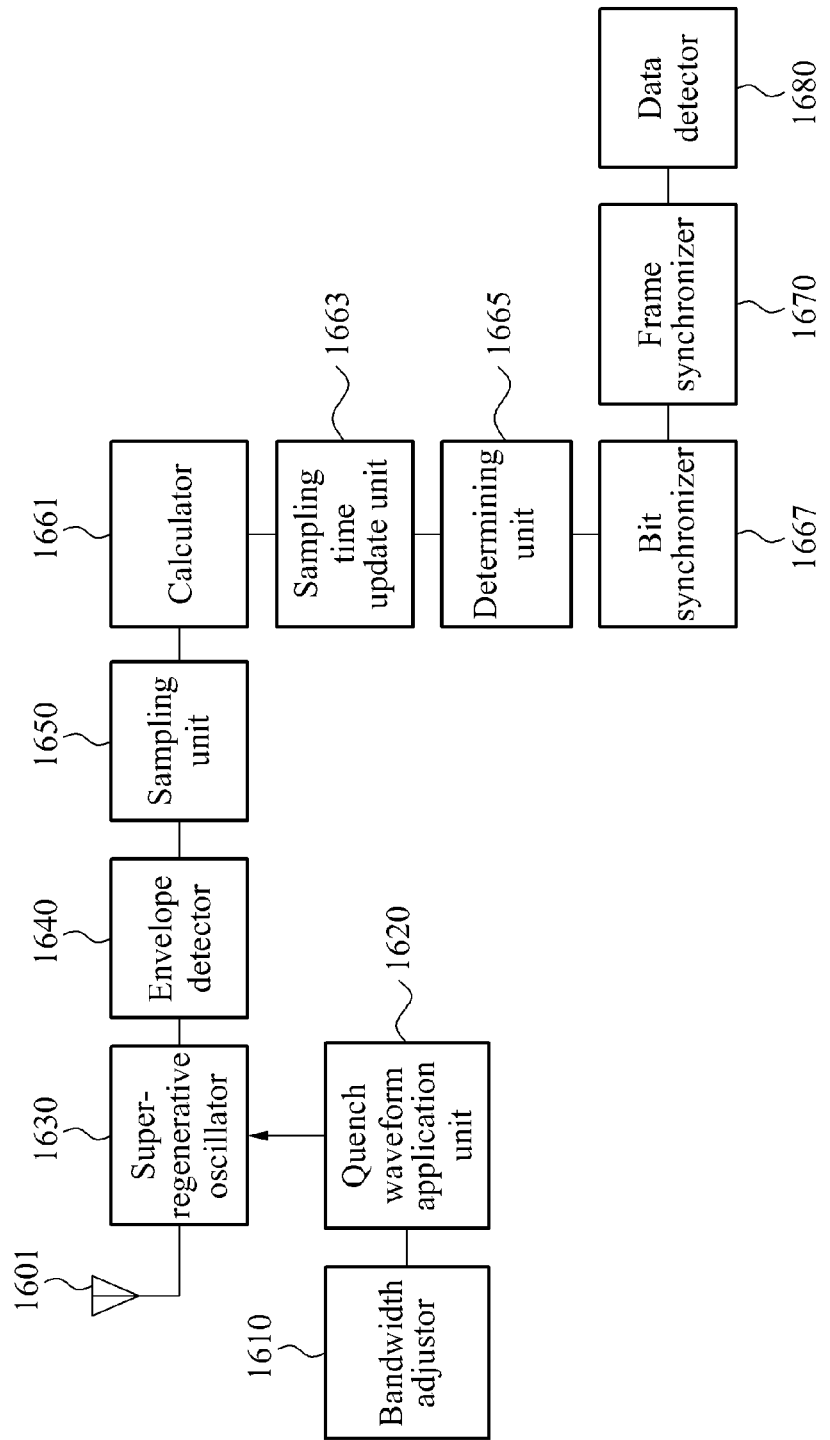
FIG. 16 is a block diagram illustrating yet another example of an ultra-low power super-regenerative receiver.

FIG. 16 illustrates yet another example of an ultra-low power super-regenerative receiver. The ultra-low power super-regenerative receiver includes a bandwidth adjustor 1610, a quench waveform application unit 1620, a super-regenerative oscillator (SRO) 1630, an envelope detector 1640, a sampling unit 1650, a calculator 1661, a sampling time update unit 1663, a determining unit 1665, a bit synchronizer 1667, a frame synchronizer 1670, and a data detector 1680.

The bandwidth adjustor 1610 dynamically adjusts a bandwidth of a received signal based on a bandwidth of a transmitted signal received through the antenna 1201. The bandwidth adjustor 1610 generates a quench waveform, controls a period of the quench waveform, and control an absolute value of a slope at a zero-crossing point of the quench waveform. That is, the bandwidth adjustor 1610 adjusts a shape of the quench waveform so that the period of the quench waveform increases, and the absolute value of the slope at the zero-crossing point of the quench waveform decreases.

The quench waveform application unit 1620 applies, to a SRO 1630, the quench waveform advanced by a predetermined time interval from an initial sampling time during a first time period, and does not apply the quench waveform during a second time period, in a first bit symbol duration time. For example, the bandwidth adjustor 1610 controls the period and the absolute value of the slope at the zero-crossing point of the quench waveform. After the second time period, the quench waveform application unit 1620 applies, to the SRO 1630, the quench waveform delayed by the predetermined time interval from the initial sampling time during a first time period in a second bit symbol duration time.

The SRO 1630 receives the quench waveform during the first time period, and does not receive the quench waveform during the second time period based on the operation of the quench waveform application unit 1620. The SRO 1630 generates an oscillation signal based on the quench waveform and the transmitted signal received through the antenna 1601 during the first time period. The oscillation signal is not generated during a time period in which the quench waveform is not received.

The envelope detector 1640 detects an envelope of the oscillation signal output from the SRO 1630. The sampling unit 1650 ADC samples peak values of the detected envelope.

The calculator 1661 calculates a correlation value between the ADC-sampled peak values and an original code sequence. The calculator 1661 calculates a correlation value between the ADC-sampled peak values and a circularly-shifted code sequence.

The calculator 1661 calculates a correlation value including a greatest value in each pulse-level position. When two pulse-level positions are included, the calculator 1661 calculates a correlation value including a greatest value between the two pulse-level positions.

The sampling time update unit 1663 adjusts the initial sampling time based on a difference between a first correlation value calculated at a pulse-level position that is temporally advanced and a second correlation value calculated at a pulse-level position that is temporally delayed. The first correlation value refers to a correlation value corresponding to a greatest value among values calculated at the pulse-level position that is temporally advanced, and the second correlation value refers to a correlation value corresponding to a greatest value among values calculated at the pulse-level position that is temporally delayed.

In response to a difference between the first correlation value and the second correlation value being greater than "0", the sampling time update unit 1663 decreases the initial sampling time by a predetermined time interval. In response to the difference between the first correlation value and the second correlation value being less than "0", the sampling time update unit 1663 increases the initial sampling time by a predetermined time interval. In response to the difference between the first correlation value and the second correlation value being equal to "0", the sampling time update unit 1663 maintains the initial sampling time.

The determining unit 1665 determines, to be an optimal sampling time, a sampling time in which an absolute value of the difference between the first correlation value and the second correlation value is less than a predetermined value. In response to the operation of determining a sampling time being repeated a maximum number of times set to a predetermined value, the determining unit 1665 determines, to be the optimal sampling time, a sampling time satisfying the maximum number of times.

The bit synchronizer 1667 performs bit synchronization by estimating a pulse-level position corresponding to the optimal sampling time, and by estimating, as a code-level position, a circularly-shifted code sequence including a greatest value. The frame synchronizer 1670 performs frame synchronization by detecting a predetermined bit sequence using an ADC value sampled through a quench waveform to which the optimal sampling time is applied. The data detector 1680 detects data using the ADC value sampled through the quench waveform to which the optimal sampling time is applied after the frame synchronization is completed.

Figure 17:
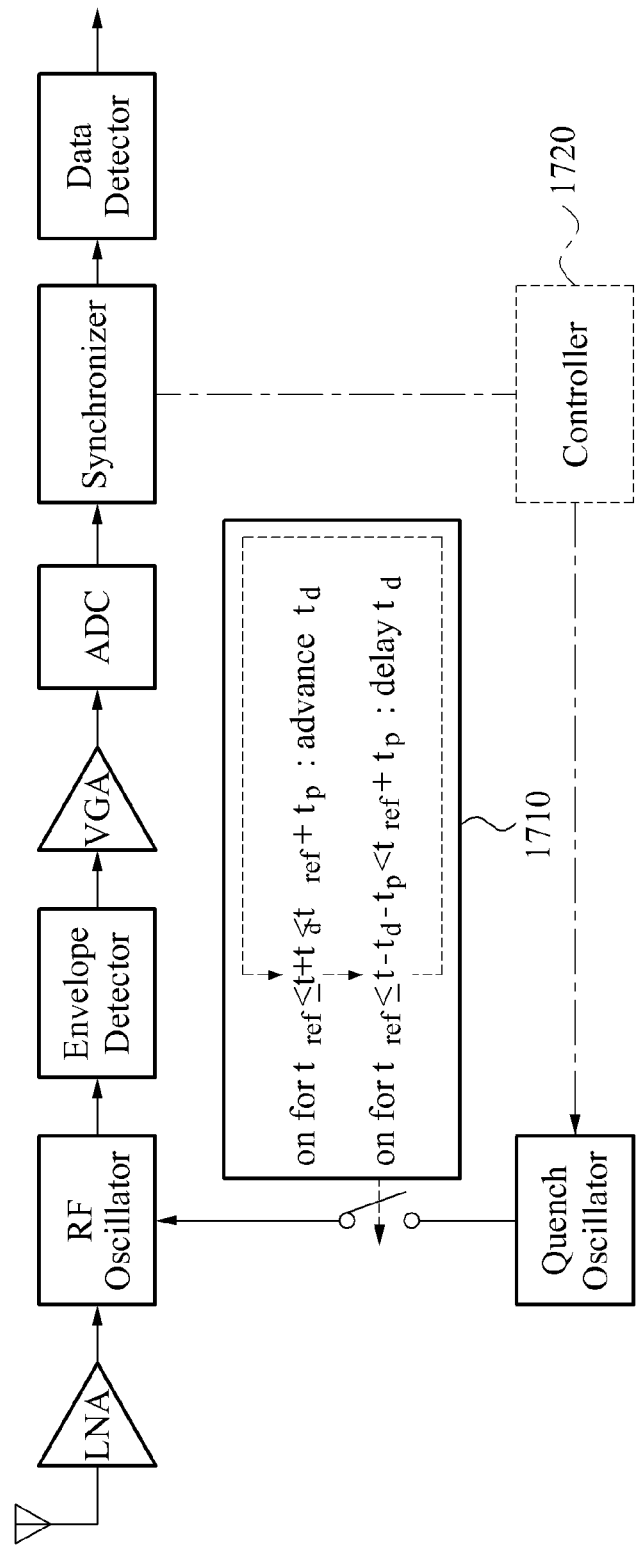
FIG. 17 is a block diagram illustrating an example of an ultra-low power super-regenerative receiver including an adaptive periodic quench-serial structure.

FIG. 17 illustrates an example of an ultra-low power super-regenerative receiver including an adaptive periodic quench-serial structure. A quench waveform application unit 1710 applies, to an RF oscillator, a quench waveform acquired from a quench oscillator and advanced by a time period $t_d$ from a reference time period $t_{ref}$ during a predetermined time period $t_p$ in a first symbol duration time. After the predetermined time period $t_p$, the quench waveform application unit 1710 does not apply, to the RF oscillator, a quench waveform during a predetermined time period.

In a subsequent symbol duration time, the quench waveform application unit 1710 repeats the operation of applying, to the RF oscillator, the quench waveform acquired from the quench oscillator and delayed by the time period $t_d$ from the reference time period $t_{ref}$ during the predetermined time period $t_p$. In this example, $t_{ref}$ denotes a point in time at which applying the quench waveform is started.

The RF oscillator generates an oscillation signal, which is passed through an envelope detector and a VGA. An ADC obtains ADC-sampled peak values of an envelope of the oscillation signal.

A synchronizer performs synchronization for the ADC-sampled peak values. The synchronizer performs bit synchronization of performing synchronization on a time axis of a bit unit, and frame synchronization of performing synchronization of a bit sequence unit reporting a start of a frame. A controller 1720 controls an optimal sampling time determined through the bit synchronization process of the synchronizer and through a timing of a quench waveform generated by the quench oscillator. In this example, a data detector detects data from a received signal after the frame synchronization is completed.

When compared to the parallel structure scheme, the serial scheme uses a longer period of time in acquiring the same number of ADC samples. However, use of the serial scheme reduces complexity of hardware and an ADC sampling rate, and thus, power consumption is lowered.

Figure 18:
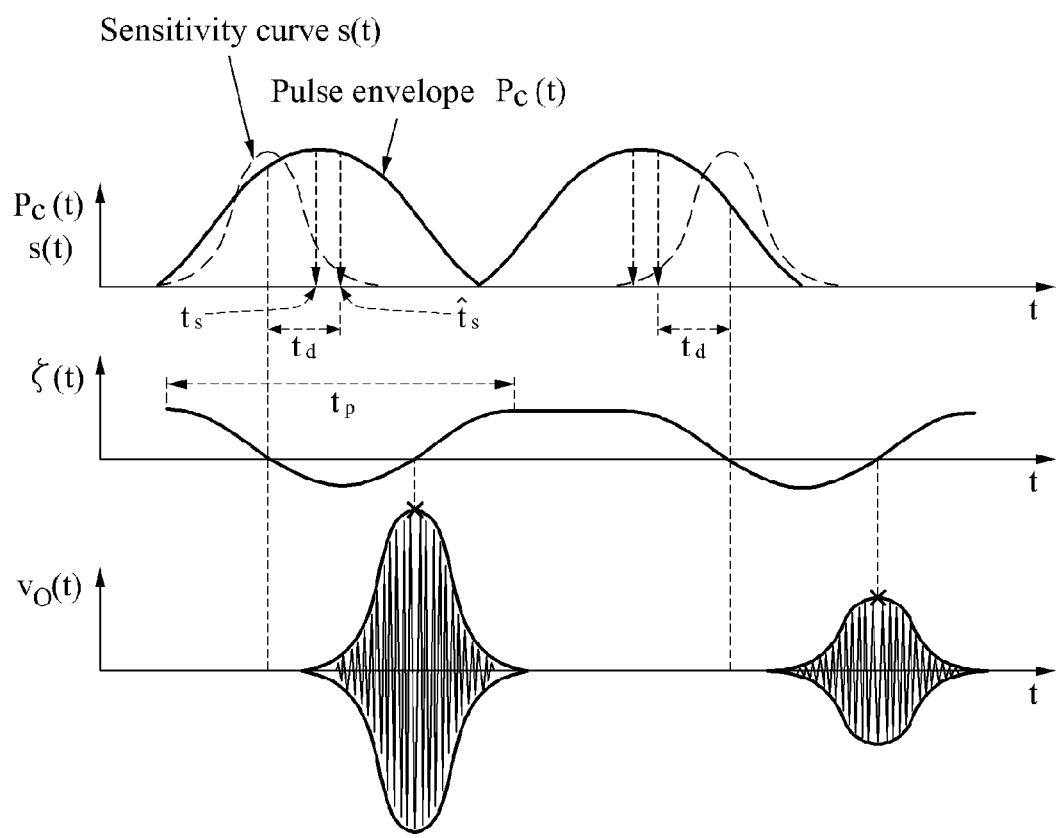
FIG. 18 is a series of graphs illustrating examples of an input signal, a damping function, and an output signal of a SRO in an adaptive periodic quench-serial structure.

FIG. 18 illustrates examples of an input signal (e.g., a pulse envelope $p_c(t)$ and a sensitivity curve $s(t)$ of the input signal), a damping function $\zeta(t)$, and an output signal $v_o(t)$ of a super-regenerative oscillator (SRO) in an adaptive periodic quench-serial structure. FIG. 18 shows a case in which a transmission bit "1" is transmitted in a continuously-repeated manner. A scheme of using two damping functions corresponding to time values advanced or delayed from a reference damping function is similar to a parallel structure scheme.

The ultra-low power super-regenerative receiver performs a substantially optimal retrieval for a pulse-level position by precisely adjusting a delay time $\hat{t}_s$ for a reference damping function $\zeta_{ref}(t-\hat{t}_s)$.

To embody a serial structure on a time axis, an ultra-low power super-regenerative receiver uses a damping function advanced by a time interval $t_d$ from a reference damping function $\zeta_{ref}(t-\hat{t}_s)$ in a first symbol duration time, and use a damping function delayed by the time interval $t_d$ from the reference damping function $\zeta_{ref}(t-\hat{t}_s)$ in a second symbol duration time.

The ultra-low power super-regenerative receiver applies, to an RF oscillator, a quench waveform acquired from a quench oscillator during a predetermined time period $t_p$ in a first symbol duration time.

To embody a serial structure on a time axis, an ultra-low power super-regenerative receiver uses a damping function advanced by a time interval $t_d$ from a reference damping function in a first symbol duration time, and use a damping function delayed by the time interval $t_d$ from the reference damping function in a second symbol duration time. Similar to the parallel structure scheme, the ultra-low power super-regenerative receiver performs optimal synchronization by delicately adjusting a sampling time of the reference damping function.

Figure 19:
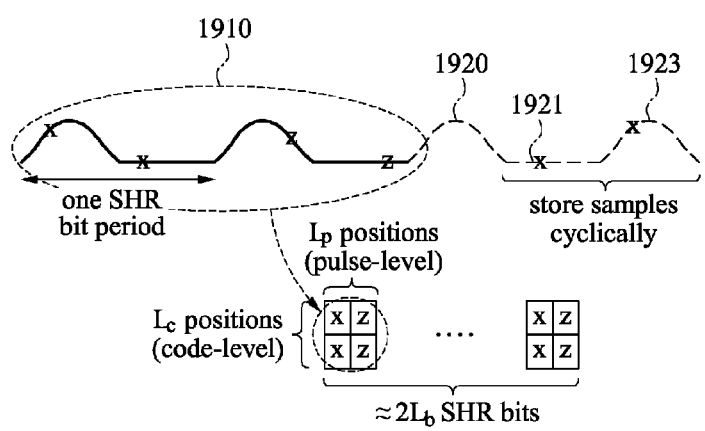
FIG. 19 is a diagram illustrating an example of bit synchronization in an adaptive periodic quench-serial structure.

FIG. 19 illustrates an example of bit synchronization in an adaptive periodic quench-serial structure. Referring to FIG. 19, a DSSS is used, a spreading factor is 2, and a spreading code sequence corresponds to [1 0].

A waveform at the far left of FIG. 19 illustrates ADC values sampled at different pulse-level positions through two quench waveforms successively generated from an RF input envelope 1910 during a bit period of two SHRs. An ultra-low power super-regenerative receiver determines a correlation value for the ADC-sampled values corresponding to each pulse-level ($L_p$) position (x, z), an original code sequence, and a circularly-shifted code sequence.

The correlation value is repeatedly-calculated in bit symbol duration times. However, to repeatedly calculate the correlation value, the following signal processing scheme is used.

After samplings at all pulse-level positions are completed, the ultra-low power super-regenerative receiver adjusts an ON/OFF state of the quench waveform so that a sampling is omitted in a symbol duration time 1920, and is performed in a subsequent symbol duration time. In this example, a symbol duration time may refer to a duration time in a chip unit. The sampling is omitted in the symbol duration time 1920 so that a sensitivity curve is not overlapped when repeatedly performing a sampling at same pulse-level positions 1921 and 1923 after performing the sampling at the initial pulse-level position.

In the sampling after the symbol duration time 1920, a code sequence appears in a form of circularly-shifted position based on an initial position, which is considered when calculating a correlation value. For example, after an ADC value is stored in a memory in a circularly-shifted form, the ADC value is correlated with the code sequence. When the spreading factor corresponds to 1, the symbol duration time is not omitted.

When a correlation value is calculated in several bit periods for a predetermined pulse-level position, an average value obtained by dividing the calculated correlation value by the corresponding number of bits is used for bit synchronization. The ultra-low power super-regenerative receiver determines correlation values including a greatest value at each pulse-level position. For example, a correlation value at a pulse-level position that is temporally advanced, that is, a correlation value obtained by a damping function $\zeta_{ref}(t-\hat{t}_s+t_d)$ may refer to a value $R(t_d)$. A correlation value at a pulse-level position that is temporally delayed, that is, a correlation value obtained by a damping function $\zeta_{ref}(t-\hat{t}_s-t_d)$ may refer to a value $R(-t_d)$.

When a difference between the correlation values, e.g., $R_{diff}=R(t_d)-R(-t_d)$, is greater than "0", the ultra-low power super-regenerative receiver decreases a delay time $\hat{t}_s$ of a reference damping function $\zeta_{ref}(t-\hat{t}_s)$ by a constant positive value $\Delta_s$. In this example, the constant positive value $\Delta_s$ is properly adjusted so that a timing is delicately adjusted. When the difference between the correlation values, e.g., $R_{diff}=R(t_d)-R(-t_d)$, is less than "0", the ultra-low power super-regenerative receiver increases the delay time $\hat{t}_s$ by the constant positive value $\Delta_s$.

When an absolute value of the difference $R_{diff}$ between the correlation values $R(t_d)$ and $R(-t_d)$ is relatively large, the ultra-low power super-regenerative receiver multiplies a relatively large integer by the constant positive value $\Delta_s$, thereby increasing a variation of the delay time $\hat{t}_s$.

As a first requirement, the ultra-low power super-regenerative receiver updates the correlation values $R(t_d)$ and $R(-t_d)$ until the absolute value of the difference $R_{diff}$ between the correlation values $R(t_d)$ and $R(-t_d)$ is less than a value $\tau_R$ set to a predetermined value, and accordingly adjusts the delay time $\hat{t}_s$. As a second requirement, the ultra-low power super-regenerative receiver updates the correlation value $R(t_d)$ and $R(-t_d)$ until a maximum number of iterations set to a predetermined value is satisfied, and accordingly adjusts the delay time $\hat{t}_s$. In response to the first requirement or the second requirement being satisfied, the ultra-low power super-regenerative receiver terminates the adjusting operation for the sampling time, and sets, to a pulse-level position, the adjusted delay time $\hat{t}_s$.

The ultra-low power super-regenerative receiver completes bit synchronization by mapping a circularly-shifted code sequence corresponding to a maximum correlation value to a code-level ($L_c$) position. The reference damping function $\zeta_{ref}(t-\hat{t}_s)$ to which the adjusted delay time $\hat{t}_s$ is applied corresponds to a quench waveform ultimately selected in a bit synchronization process.

The ultra-low power super-regenerative receiver performs frame synchronization using an ADC value sampled through the quench waveform selected in the bit synchronization process. The frame synchronization detects a predetermined bit sequence by performing the bit synchronization process a predetermined number of times. After the frame synchronization is completed, a data detection signal processing is performed using the ADC value sampled through the quench waveform selected in the bit synchronization process.

Figure 20:
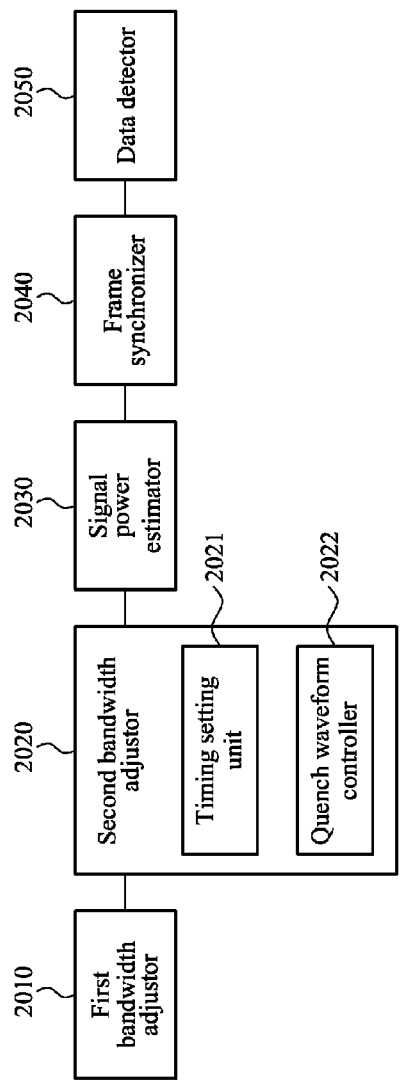
FIG. 20 is a block diagram illustrating a further example of an ultra-low power super-regenerative receiver.

FIG. 20 illustrates a further example of an ultra-low power super-regenerative receiver. The ultra-low power super-regenerative receiver includes a first bandwidth adjustor 2010, a second bandwidth adjustor 2020, a signal power estimator 2030, a frame synchronizer 2040, and a data detector 2050.

The first bandwidth adjustor 2010 generates a quench waveform including a shorter period than a period of a transmitted signal received at the first bandwidth adjustor 2010. The first bandwidth adjustor 2010 acquires ADC samples in a symbol duration time of a received signal using the generated quench waveform. The first bandwidth adjustor 2010 performs bit synchronization using sample values of the acquired ADC samples.

The second bandwidth adjustor 2020 sets a time for the quench waveform based on a pulse-level position acquired through the bit synchronization. The second bandwidth adjustor 2020 controls a period of the quench waveform based on a bandwidth of the transmitted signal, and controls an absolute value of a slope at a zero-crossing point of the quench waveform, thereby dynamically adjusting a bandwidth of a received signal of the ultra-low power super-regenerative receiver.

In more detail, the second bandwidth adjustor 2020 includes a timing setting unit 2021 and a quench waveform controller 2022. The timing setting unit 2021 sets the time for the quench waveform based on the pulse-level position acquired through the bit synchronization. The quench waveform controller 2022 controls a shape of the quench waveform by increasing the period of the quench waveform based on the bandwidth of the transmitted signal, and by decreasing the slope at the zero-crossing point of the quench waveform.

The signal power estimator 2030 estimates signal powers for the ADC samples sampled in the symbol duration time of the received signal. The frame synchronizer 2040 performs frame synchronization by detecting a predetermined bit sequence using the ADC samples. The data detector 2050 detects data using an ACD value sampled through the quench waveform controlled by the second bandwidth adjustor 2020 after the frame synchronization is completed.

Figure 21:
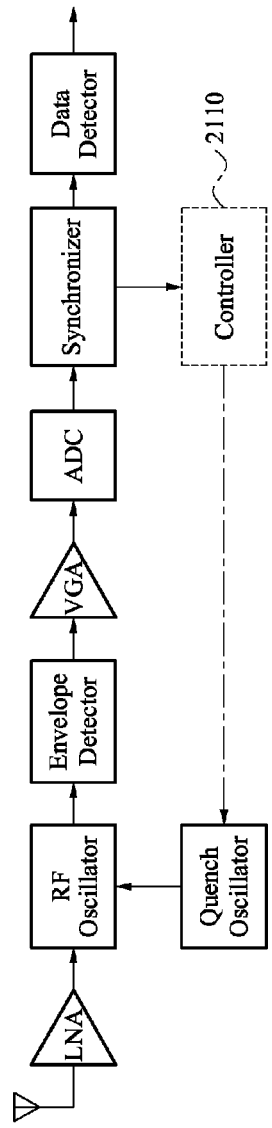
FIG. 21 is a block diagram illustrating an example of an ultra-low power super-regenerative receiver including a two-stage structure.

FIG. 21 illustrates an example of an ultra-low power super-regenerative receiver including a two-stage structure. In the two-stage structure, a scheme of using a damping function including a relatively short period until a bit synchronization process, is applied in a first stage. A scheme of using a damping function including a relatively long period in a frame synchronization and data detection process after the bit synchronization is completed, is applied in a second stage. Thus, a reception frequency response characteristic may include a relatively large area by narrowing a time width of a sensitivity curve in the first stage, and a reception frequency response characteristic may be narrowed similar to a transmitted signal by widening a time width of a sensitivity curve in the second stage.

Referring to FIG. 21, after a bit synchronization process is completed in a synchronizer, a controller 2110 sets a quench timing based on a synchronization position determined in the bit synchronization process. The controller 2110 generates a new quench waveform including a changed quench rate.

Thereafter, the ultra-low power super-regenerative receiver performs frame synchronization by ADC sampling an RF received signal. In response to the quench waveform being changed through the controller 2110, an oscillation signal outputted from an RF oscillator also changes, and thus, an estimation process for signal power may be performed between the change of the quench waveform and the frame synchronization.

Figure 22:
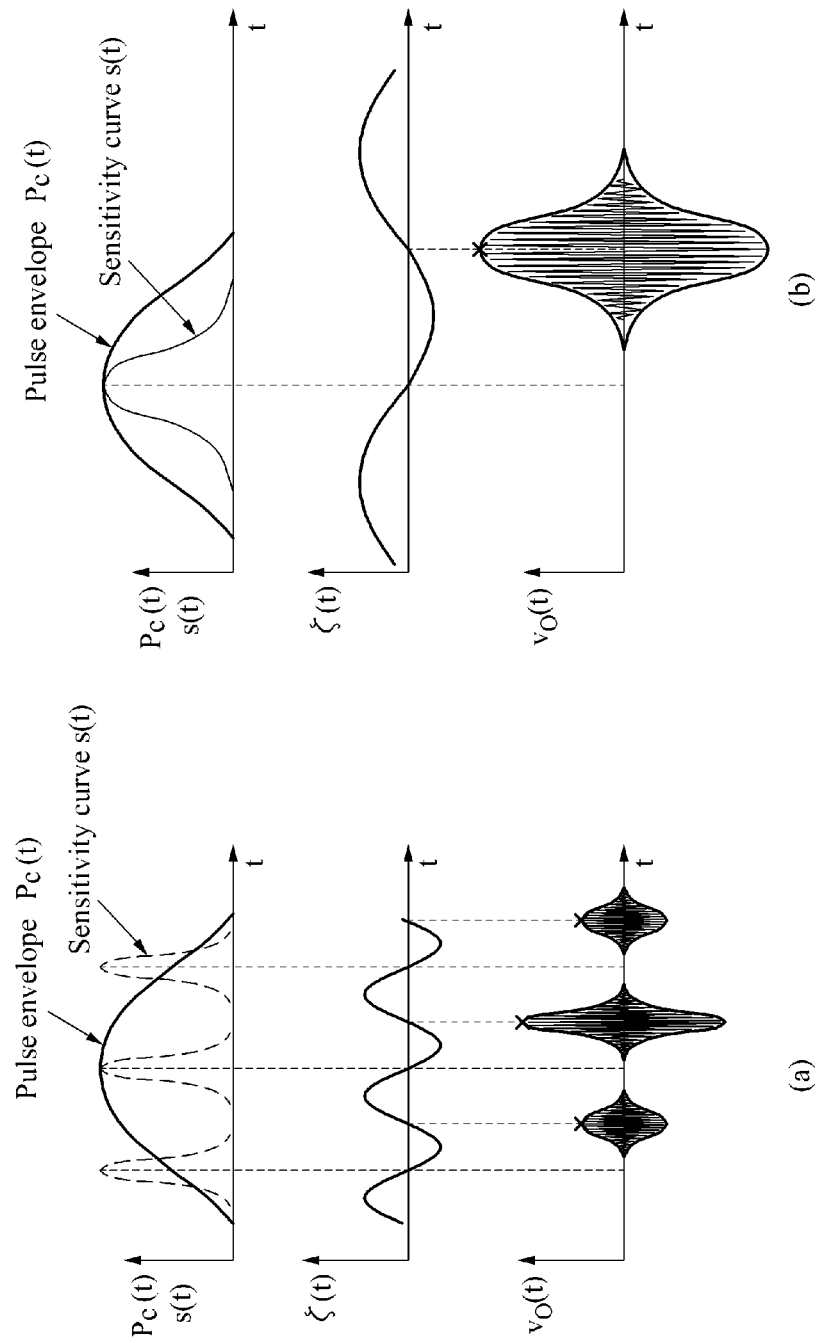
FIG. 22 is a series of graphs illustrating examples of an input signal, a damping function, and an output signal of a SRO in a two-stage structure.

FIG. 22 illustrates examples of an input signal (e.g., a pulse envelope $p_c(t)$ and a sensitivity curve s(t) of the input signal), a damping function $\zeta(t)$, and an output signal $v_o(t)$ of a super-regenerative oscillator (SRO) in a two-stage structure. Waveforms (a) correspond to signal waveforms until a bit synchronization process, and three over-samplings are obtained for a symbol duration time. An ultra-low power super-regenerative receiver performs the bit synchronization process through a correlation with a code sequence using as many samples for a pulse-level position as a number of over-samplings.

Waveforms (b) correspond to signal waveforms after the bit synchronization process. In response to the bit synchronization process being completed, the ultra-low power super-regenerative receiver sets a time for a quench waveform at a pulse-level position estimated in the bit synchronization process, and adjusts a period of the quench waveform and a slope at a zero-crossing point of the quench waveform, thereby adjusting a shape of the quench waveform. The ultra-low power super-regenerative receiver performs frame synchronization and data detection using the adjusted quench waveform.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An ultra-low power super-regenerative receiver comprising:
   a quench waveform generator configured to generate a quench waveform;
   a super-regenerative oscillator configured to generate an oscillation signal based on the quench waveform; and
   a bandwidth adjustor configured to control the quench waveform based on a bandwidth of a signal received by the ultra-low power super-regenerative receiver, to dynamically adjust a bandwidth of the oscillation signal.

2. The ultra-low power super-regenerative receiver of claim 1, wherein the bandwidth adjustor is further configured to:
   control a period of the quench waveform based on the bandwidth of the received signal; and
   control an absolute value of a slope at a zero-crossing point of the quench waveform based on the bandwidth of the received signal.

3. The ultra-low power super-regenerative receiver of claim 1, wherein:
   the quench waveform generator is further configured to delay the quench waveform by a predetermined time interval to generate as many quench waveforms as a number of over-samplings; and
   the bandwidth adjustor is further configured to control the quench waveforms based on the bandwidth of the received signal.

4. The ultra-low power super-regenerative receiver of claim 3, further comprising:
   super-regenerative oscillators configured to concurrently generate oscillation signals based on the respective quench waveforms in a symbol duration time of the oscillation signals.

5. The ultra-low power super-regenerative receiver of claim 4, further comprising:
   envelope detectors configured to detect envelopes of the respective oscillation signals; and
   a sampling unit configured to sample and perform analog-to-digital conversion (ADC) of peak values of the envelopes.

6. The ultra-low power super-regenerative receiver of claim 5, further comprising:
   a bit synchronizer configured to
   determine a first correlation value between the peak values and an original code sequence,
   determine a second correlation value between the peak values and a circularly-shifted code sequence, and
   determine a pulse-level position and a code-level position of one of the envelopes based on a maximum correlation value between the correlation values.

7. The ultra-low power super-regenerative receiver of claim 6, further comprising:
   a frame synchronizer configured to detect a predetermined bit sequence based on the pulse-level position; and
   a data detector configured to detect data based on the pulse-level position after the detecting of the predetermined bit sequence.

8. The ultra-low power super-regenerative receiver of claim 1, further comprising:
   a quench waveform application unit configured to
   apply, to the super-regenerative oscillator, the quench waveform during a first time period in a symbol duration time of the oscillation signal and based on an over-sampling rate, and
   apply, to the super-regenerative oscillator, the quench waveform after a second time period of time delay in the symbol duration time.

9. The ultra-low power super-regenerative receiver of claim 8, further comprising:
   an envelope detector configured to detect an envelope of the oscillation signal; and
   a sampling unit configured to sample and perform ADC of peak values of the envelope.

10. The ultra-low power super-regenerative receiver of claim 9, further comprising:
    a bit synchronizer configured to
    determine a correlation value between the peak values and an original code sequence,
    determine a correlation value between the peak values and a circularly-shifted code sequence, and
    determine a pulse-level position and a code-level position of the envelope based on a maximum correlation value among the correlation values.

11. The ultra-low power super-regenerative receiver of claim 10, further comprising:
    a frame synchronizer configured to detect a predetermined bit sequence based on the pulse-level position; and
    a data detector configured to detect data based on the pulse-level position after the detecting of the predetermined bit sequence.

12. The ultra-low power super-regenerative receiver of claim 1, further comprising:
    a first quench waveform generator configured to delay the quench waveform by a predetermined time interval based on an initial sampling time to generate a first quench waveform; and
    a second quench waveform generator configured to advance the quench waveform by the predetermined time interval based on the initial sampling time to generate a second quench waveform.

13. The ultra-low power super-regenerative receiver of claim 12, further comprising:

a first super-regenerative oscillator configured to generate a first oscillation signal based on the first quench waveform in a symbol duration time of the oscillation signal; and a second super-regenerative oscillator configured to generate a second oscillation signal based on the second quench waveform in the symbol duration time.

14. The ultra-low power super-regenerative receiver of claim 13, further comprising:

a first envelope detector configured to detect a first envelope of the first oscillation signal;

a second envelope detector configured to detect a second envelope of the second oscillation signal; and a sampling unit configured to sample and perform ADC of respective peak values of the first envelope and the second envelope.

15. The ultra-low power super-regenerative receiver of claim 14, further comprising:

a calculator configured to calculate a correlation value between the peak values and an original code sequence, calculate a correlation value between the peak values and a circularly-shifted code sequence, and calculate a correlation value comprising a greatest value in each pulse-level position;

a sampling time update unit configured to update the initial sampling time based on a difference between a first correlation value corresponding to a greatest value among values calculated at a pulse-level position that is temporally advanced and a second correlation value corresponding to a greatest value among values calculated at a pulse-level position that is temporally delayed;

a determining unit configured to determine, to be an optimal sampling time, a sampling time in which an absolute value of the difference between the first correlation value and the second correlation value is less than a predetermined value; and a bit synchronizer configured to determine a pulse-level position corresponding to the optimal sampling time, and determine, as a code-level position, a circularly-shifted code sequence comprising a greatest value.

16. The ultra-low power super-regenerative receiver of claim 15, further comprising:

a frame synchronizer configured to detect a predetermined bit sequence based on a peak value sampled through a quench waveform to which the optimal sampling time is applied; and a data detector configured to detect data based on the peak value after the detecting of the predetermined bit sequence.

17. The ultra-low power super-regenerative receiver of claim 1, further comprising:

a quench waveform application unit configured to:

advance the quench waveform by a predetermined time interval based on an initial sampling time, apply, to the super-regenerative oscillator, the advanced quench waveform during a first time period in a symbol duration time of the oscillation signal, delay the quench waveform by the predetermined time interval based on the initial sampling time, and apply, to the super-regenerative oscillator, the delayed quench waveform after a second time period of time delay in the symbol duration time.

18. The ultra-low power super-regenerative receiver of claim 17, further comprising:

an envelope detector configured to detect an envelope of the oscillation signal; and a sampling unit configured to sample and perform analog-to-digital conversion (ADC) peak values of the envelope.

19. The ultra-low power super-regenerative receiver of claim 18, further comprising:

a calculator configured to calculate a correlation value between the peak values and an original code sequence, calculate a correlation value between the peak values and a circularly-shifted code sequence, and calculate a correlation value comprising a greatest value in each pulse-level position;

a sampling time update unit configured to update the initial sampling time based on a difference between a first correlation value corresponding to a greatest value among values calculated at a pulse-level position that is temporally advanced and a second correlation value corresponding to a greatest value among values calculated at a pulse-level position that is temporally delayed;

a determining unit configured to determine, to be an optimal sampling time, a sampling time in which an absolute value of the difference between the first correlation value and the second correlation value is less than a predetermined value; and a bit synchronizer to determine a pulse-level position corresponding to the optimal sampling time, and determine, as a code-level position, a circularly-shifted code sequence comprising a greatest value.

20. An ultra-low power super-regenerative receiver comprising:

a first bandwidth adjustor configured to generate a quench waveform comprising a shorter period than a period of a signal received by the ultra-low power super-regenerative receiver, acquire analog-to-digital conversion (ADC) samples in a symbol duration time of an output signal based on the quench waveform, and perform bit synchronization based on the ADC samples to generate a pulse-level position of the received signal; and a second bandwidth adjustor configured to set a time for the quench waveform based on the pulse-level position, control a period of the quench waveform based on a bandwidth of the received signal, and control an absolute value of a slope at a zero-crossing point of the quench waveform, to dynamically adjust a bandwidth of the output signal.

21. The ultra-low power super-regenerative receiver of claim 20, wherein the second bandwidth adjustor comprises:

a quench waveform controller configured to increase the period of the quench waveform based on the bandwidth of the received signal, and decrease the slope at the zero-crossing point of the quench waveform, to control a shape of the quench waveform.

22. The ultra-low power super-regenerative receiver of claim 20, further comprising:

a signal power estimator configured to estimate signal powers for the ADC samples;

a frame synchronizer configured to detect a predetermined bit sequence based on the ADC samples; and a data detector configured to detect data based on one of the ADC samples after the detecting of the predetermined bit sequence.

23. An ultra-low power super-regenerative receiving method comprising:
  generating a quench waveform;
  generating an oscillation signal based on the quench waveform; and
  controlling, with a computer, the quench waveform based on a bandwidth of an input signal, to dynamically adjust a bandwidth of the oscillation signal.

24. The ultra-low power super-regenerative receiving method of claim 23, further comprising:
  controlling a period of the quench waveform based on the bandwidth of the input signal;
  controlling an absolute value of a slope at a zero-crossing point of the quench waveform based on the bandwidth of the input signal;
  generating an oscillation signal based on the quench waveform in a symbol duration time of the oscillation signal;
  detecting an envelope of the oscillation signal; and
  sampling and performing analog-to-digital conversion (ADC) of peak values of the envelope.

25. The ultra-low power super-regenerative receiving method of claim 24, further comprising:
  determining a correlation value between the peak values and an original code sequence;
  determining a correlation value between the peak values and a circularly-shifted code sequence; and
  determining a pulse-level position and a code-level position based on a maximum correlation value between the correlation values.

* * * * *